US010778948B2

(12) United States Patent
Sakai et al.

(10) Patent No.: US 10,778,948 B2
(45) Date of Patent: Sep. 15, 2020

(54) IMAGING APPARATUS AND ENDOSCOPE APPARATUS

(71) Applicant: OLYMPUS CORPORATION, Tokyo (JP)

(72) Inventors: Hiroshi Sakai, Sagamihara (JP); Shinichi Imade, Iruma (JP); Hideaki Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/601,821

(22) Filed: Oct. 15, 2019

(65) Prior Publication Data

US 2020/0045282 A1 Feb. 6, 2020

Related U.S. Application Data

(63) Continuation of application No. PCT/JP2017/015698, filed on Apr. 19, 2017.

(51) Int. Cl.
*H04N 9/64* (2006.01)
*A61B 1/06* (2006.01)
*H04N 9/04* (2006.01)

(52) U.S. Cl.
CPC ......... *H04N 9/646* (2013.01); *H04N 9/04551* (2018.08)

(58) Field of Classification Search
CPC ............................ H04N 9/646; A61B 1/0646
USPC ......................................................... 348/82
See application file for complete search history.

(56) References Cited

U.S. PATENT DOCUMENTS

2016/0105659 A1\* 4/2016 Hayashi ................ G02B 21/22
348/47

FOREIGN PATENT DOCUMENTS

| EP | 3015892 A1 | 5/2016 |
| JP | 2013-044806 A | 3/2013 |
| JP | 2013-246052 A | 12/2013 |
| JP | 2015-011058 A | 1/2015 |

OTHER PUBLICATIONS

International Search Report dated Jul. 18, 2017 issued in PCT/JP2017/015698.

\* cited by examiner

*Primary Examiner* — Jeffery A Williams
(74) *Attorney, Agent, or Firm* — Scully, Scott, Murphy & Presser, P.C.

(57) ABSTRACT

In an imaging apparatus, a pupil division optical system includes a first pupil transmitting light of a first wavelength band and a second pupil transmitting light of a second wavelength band different from the first wavelength band. An imaging device is configured to capture an image of light transmitted through the pupil division optical system and a first color filter having a first transmittance characteristic and light transmitted through the pupil division optical system and a second color filter having a second transmittance characteristic partially overlapping the first transmittance characteristic, and output the captured image. A processor is configured to generate a monochrome correction image or a correction image by correcting a value that is based on components overlapping between the first transmittance characteristic and the second transmittance characteristic for the captured image.

19 Claims, 17 Drawing Sheets

FIG. 4

| R_00 | Gr_01 | R_02 | Gr_03 |
|------|-------|------|-------|
| Gb_10 | B_11 | Gb_12 | B_13 |
| R_20 | Gr_21 | R_22 | Gr_23 |
| Gb_30 | B_31 | Gb_32 | B_33 |

FIG. 5

| R_00 -OB | R_00 -OB | R_02 -OB | R_02 -OB |
|----------|----------|----------|----------|
| R_00 -OB | R_00 -OB | R_02 -OB | R_02 -OB |
| R_20 -OB | R_20 -OB | R_22 -OB | R_22 -OB |
| R_20 -OB | R_20 -OB | R_22 -OB | R_22 -OB |

FIG. 6

| Gr_01<br>−OB | Gr_01<br>−OB | Gr_03<br>−OB | Gr_03<br>−OB |
|---|---|---|---|
| Gb_10<br>−OB | Gb_10<br>−OB | Gb_12<br>−OB | Gb_12<br>−OB |
| Gr_21<br>−OB | Gr_21<br>−OB | Gr_23<br>−OB | Gr_23<br>−OB |
| Gb_30<br>−OB | Gb_30<br>−OB | Gb_32<br>−OB | Gb_32<br>−OB |

FIG. 7

| B_11<br>−OB | B_11<br>−OB | B_13<br>−OB | B_13<br>−OB |
|---|---|---|---|
| B_11<br>−OB | B_11<br>−OB | B_13<br>−OB | B_13<br>−OB |
| B_31<br>−OB | B_31<br>−OB | B_33<br>−OB | B_33<br>−OB |
| B_31<br>−OB | B_31<br>−OB | B_33<br>−OB | B_33<br>−OB |

FIG. 12

| R'_00 | Gr'_01 | R'_02 | Gr'_03 |
|---|---|---|---|
| Gb'_10 | B'_11 | Gb'_12 | B'_13 |
| R'_20 | Gr'_21 | R'_22 | Gr'_23 |
| Gb'_30 | B'_31 | Gb'_32 | B'_33 |

IMAGING APPARATUS AND ENDOSCOPE APPARATUS

The present application is a continuation application based on International Patent Application No. PCT/JP2017/015698 filed on Apr. 19, 2017, the content of which is incorporated herein by reference.

BACKGROUND OF THE INVENTION

Field of the Invention

The present invention relates to an imaging apparatus and an endoscope apparatus.

Description of Related Art

Imaging devices having color filters of primary colors consisting of R (red), G (green), and B (blue) have been widely used for an imaging apparatus in recent years. When a band of the color filter becomes wide, the amount of transmitted light increases and imaging sensitivity increases. For this reason, in a typical imaging device, a method of causing transmittance characteristics of R, G and B color filters to intentionally overlap is used.

In a phase difference AF or the like, phase difference detection using a parallax between two pupils is performed. For example, in Japanese Unexamined Patent Application, First Publication No. 2013-044806, an imaging apparatus including a pupil division optical system having a first pupil area transmitting R and G light and a second pupil area transmitting G and B light is disclosed. A phase difference is detected on the basis of a positional deviation between an R image and a B image acquired by a color imaging device mounted on this imaging apparatus.

SUMMARY OF THE INVENTION

According to a first aspect of the present invention, an imaging apparatus includes a pupil division optical system, an imaging device, a processor, and a display. The pupil division optical system includes a first pupil transmitting light of a first wavelength band and a second pupil transmitting light of a second wavelength band different from the first wavelength band. The imaging device is configured to capture an image of light transmitted through the pupil division optical system and a first color filter having a first transmittance characteristic and light transmitted through the pupil division optical system and a second color filter having a second transmittance characteristic partially overlapping the first transmittance characteristic, and output the captured image. The processor is configured to generate a monochrome correction image or a correction image by correcting a value that is based on components overlapping between the first transmittance characteristic and the second transmittance characteristic for the captured image. The monochrome correction image includes a value that is based on one of the first transmittance characteristic and the second transmittance characteristic. The correction image includes a value that is based on the first transmittance characteristic and a value that is based on the second transmittance characteristic. The display is configured to display the monochrome correction image generated by the processor or display the monochrome correction image generated by processing the correction image.

According to a second aspect of the present invention, an imaging apparatus includes a pupil division optical system, an imaging device, and a processor. The pupil division optical system includes a first pupil transmitting light of a first wavelength band and a second pupil transmitting light of a second wavelength band different from the first wavelength band. The imaging device is configured to capture an image of light transmitted through the pupil division optical system and a first color filter having a first transmittance characteristic and light transmitted through the pupil division optical system and a second color filter having a second transmittance characteristic partially overlapping the first transmittance characteristic, and output the captured image. The processor is configured to generate a monochrome correction image or a correction image by correcting a value that is based on components overlapping between the first transmittance characteristic and the second transmittance characteristic for the captured image. The monochrome correction image includes a value that is based on one of the first transmittance characteristic and the second transmittance characteristic. The correction image includes a value that is based on the first transmittance characteristic and a value that is based on the second transmittance characteristic. The processor is configured to output the monochrome correction image to a display or output the monochrome correction image generated by processing the correction image to the display.

According to a third aspect of the present invention, in the first aspect, the processor may be configured to generate at least one of a first monochrome correction image and a second monochrome correction image. The first monochrome correction image is the monochrome correction image generated by correcting a value that is based on components overlapping between the first transmittance characteristic and the second transmittance characteristic for the captured image having components that are based on the first transmittance characteristic. The second monochrome correction image is the monochrome correction image generated by correcting a value that is based on components overlapping between the first transmittance characteristic and the second transmittance characteristic for the captured image having components that are based on the second transmittance characteristic.

According to a fourth aspect of the present invention, in the second aspect, the processor may be configured to generate at least one of a first monochrome correction image and a second monochrome correction image. The first monochrome correction image is the monochrome correction image generated by correcting a value that is based on components overlapping between the first transmittance characteristic and the second transmittance characteristic for the captured image having components that are based on the first transmittance characteristic. The second monochrome correction image is the monochrome correction image generated by correcting a value that is based on components overlapping between the first transmittance characteristic and the second transmittance characteristic for the captured image having components that are based on the second transmittance characteristic.

According to a fifth aspect of the present invention, in the third aspect, the processor may be configured to generate at least one of the first monochrome correction image and the second monochrome correction image in accordance with an instruction from a user.

According to a sixth aspect of the present invention, in the fourth aspect, the processor may be configured to generate at least one of the first monochrome correction image and the second monochrome correction image in accordance with an instruction from a user.

According to a seventh aspect of the present invention, in the third aspect, the processor may be configured to generate at least one of the first monochrome correction image and the second monochrome correction image in accordance with a result of analyzing the captured image.

According to an eighth aspect of the present invention, in the fourth aspect, the processor may be configured to generate at least one of the first monochrome correction image and the second monochrome correction image in accordance with a result of analyzing the captured image.

According to a ninth aspect of the present invention, in the third aspect, the processor may be configured to generate at least one of the first monochrome correction image and the second monochrome correction image in accordance with a histogram of the captured image.

According to a tenth aspect of the present invention, in the fourth aspect, the processor may be configured to generate at least one of the first monochrome correction image and the second monochrome correction image in accordance with a histogram of the captured image.

According to an eleventh aspect of the present invention, in the third aspect, the processor may be configured to generate at least one of the first monochrome correction image and the second monochrome correction image in accordance with contrast of the captured image.

According to a twelfth aspect of the present invention, in the fourth aspect, the processor may be configured to generate at least one of the first monochrome correction image and the second monochrome correction image in accordance with contrast of the captured image.

According to a thirteenth aspect of the present invention, in the third aspect, the processor may be configured to generate at least one of the first monochrome correction image and the second monochrome correction image in accordance with spectral characteristics of a subject.

According to a fourteenth aspect of the present invention, in the fourth aspect, the processor may be configured to generate at least one of the first monochrome correction image and the second monochrome correction image in accordance with spectral characteristics of a subject.

According to a fifteenth aspect of the present invention, in the third aspect, the processor may be configured to generate a first monochrome correction image and a second monochrome correction image in parallel with analysis of the captured image. The first monochrome correction image is the monochrome correction image generated by correcting a value that is based on components overlapping between the first transmittance characteristic and the second transmittance characteristic for the captured image having components that are based on the first transmittance characteristic. The second monochrome correction image is the monochrome correction image generated by correcting a value that is based on components overlapping between the first transmittance characteristic and the second transmittance characteristic for the captured image having components that are based on the second transmittance characteristic. The processor may be configured to select at least one of the first monochrome correction image and the second monochrome correction image in accordance with a result of analyzing the captured image.

According to a sixteenth aspect of the present invention, in the fourth aspect, the processor is configured to generate a first monochrome correction image and a second monochrome correction image in parallel with analysis of the captured image. The first monochrome correction image is the monochrome correction image generated by correcting a value that is based on components overlapping between the first transmittance characteristic and the second transmittance characteristic for the captured image having components that are based on the first transmittance characteristic. The second monochrome correction image is the monochrome correction image generated by correcting a value that is based on components overlapping between the first transmittance characteristic and the second transmittance characteristic for the captured image having components that are based on the second transmittance characteristic. The processor may be configured to select at least one of the first monochrome correction image and the second monochrome correction image in accordance with a result of analyzing the captured image.

According to a seventeenth aspect of the present invention, in the first aspect, the processor may be configured to generate the monochrome correction image by processing the correction image.

According to an eighteenth aspect of the present invention, in the second aspect, the processor may be configured to generate the monochrome correction image by processing the correction image.

According to an eleventh aspect of the present invention, an endoscope apparatus includes the imaging apparatus according to the first aspect.

BRIEF DESCRIPTION OF THE DRAWINGS

FIG. 4 is a diagram showing a pixel arrangement of a Bayer image in the first embodiment of the present invention.

FIG. 5 is a diagram showing a pixel arrangement of an R image in the first embodiment of the present invention.

FIG. 6 is a diagram showing a pixel arrangement of a G image in the first embodiment of the present invention.

FIG. 7 is a diagram showing a pixel arrangement of a B image in the first embodiment of the present invention.

FIG. 12 is a diagram showing a pixel arrangement of a Bayer' image in the third embodiment of the present invention.

DETAILED DESCRIPTION OF THE INVENTION

When an imaging apparatus disclosed in Japanese Unexamined Patent Application, First Publication No. 2013-044806 captures an image of a subject at a position away from the focusing position, color shift in an image occurs. The imaging apparatus including a pupil division optical system disclosed in Japanese Unexamined Patent Application, First Publication No. 2013-044806 approximates a shape and a centroid position of blur in an R image and a B image to a shape and a centroid position of blur in a G image so as to display an image in which double images due to color shift are suppressed.

In the imaging apparatus disclosed in Japanese Unexamined Patent Application, First Publication No. 2013-044806, correction of an R image and a B image is performed on the basis of a shape of blur in a G image. For this reason, the premise is that a waveform of a G image has no distortion (no double images). However, there are cases in which a waveform of a G image has distortion. Hereinafter, distortion of a waveform of a G image will be described with reference to FIGS. 24 to 26.

Figure 24:
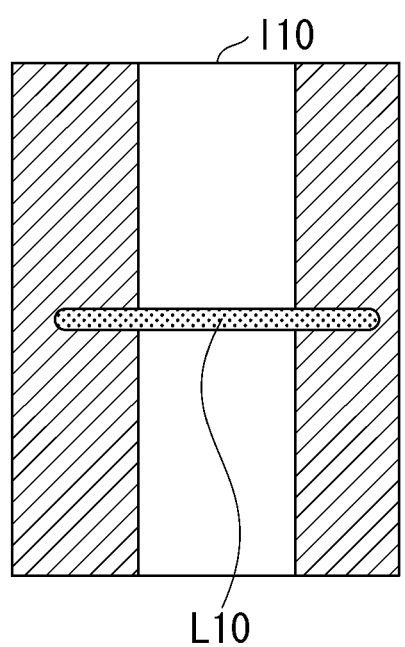
FIG. 24 is a diagram showing a captured image of a subject in white and black.
Figure 25:
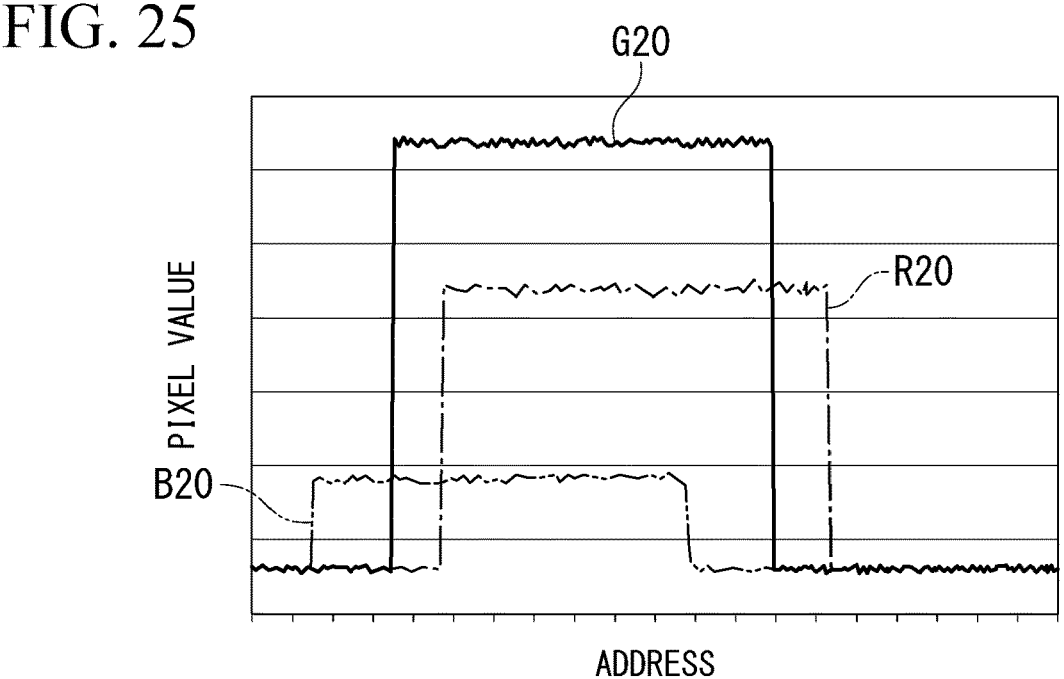
FIG. 25 is a diagram showing a line profile of a captured image of a subject in white and black.
Figure 26:
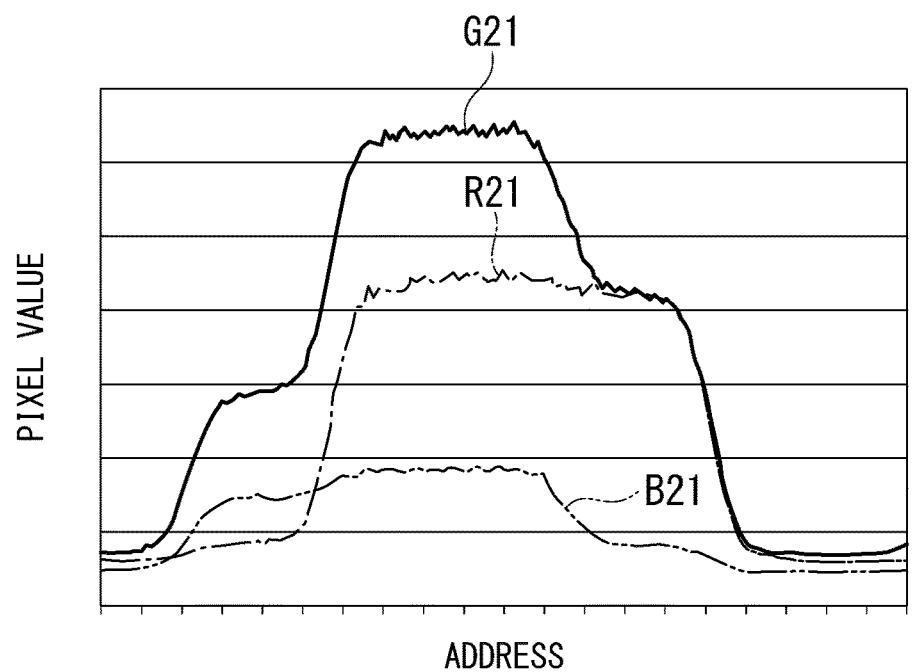
FIG. 26 is a diagram showing a line profile of a captured image of a subject in white and black.

FIG. 24 shows a captured image I10 of a subject in black and white. FIGS. 25 and 26 show a profile of a line L10 in the captured image I10. The horizontal axis in FIGS. 25 and 26 represents an address of the captured image in the horizontal direction and the vertical axis represents a pixel value of the captured image. FIG. 25 shows a profile in a case where transmittance characteristics of color filters of respective colors do not overlap. FIG. 26 shows a profile in a case where transmittance characteristics of color filters of respective colors overlap. A profile R20 and a profile R21 are a profile of an R image. The R image includes information of pixels in which R color filters are disposed. A profile G20 and a profile G21 are a profile of a G image. The G image includes information of pixels in which G color filters are disposed. A profile B20 and a profile B21 are a profile of a B image. The B image includes information of pixels in which B color filters are disposed.

FIG. 25 shows that a waveform of the profile G20 of the G image has no distortion, but FIG. 26 shows that a waveform of the profile G21 of the G image has distortion. Since light transmitted through a G color filter includes components of R and B, distortion occurs in the waveform of the profile G21 of the G image. In the imaging apparatus disclosed in Japanese Unexamined Patent Application, First Publication No. 2013-044806, the profile G20 shown in FIG. 25 is the premise and the distortion of the waveform that occurs in the profile G21 shown in FIG. 26 is not the premise. For this reason, in a case where a shape and a centroid position of blur in the R image and the B image are corrected on the bases of the G image represented by the profile G21 shown in FIG. 26, there may be issues that the imaging apparatus displays an image including double images due to color shift.

Hereinafter, embodiments of the present invention will be described with reference to the drawings.

First Embodiment

Figure 1:
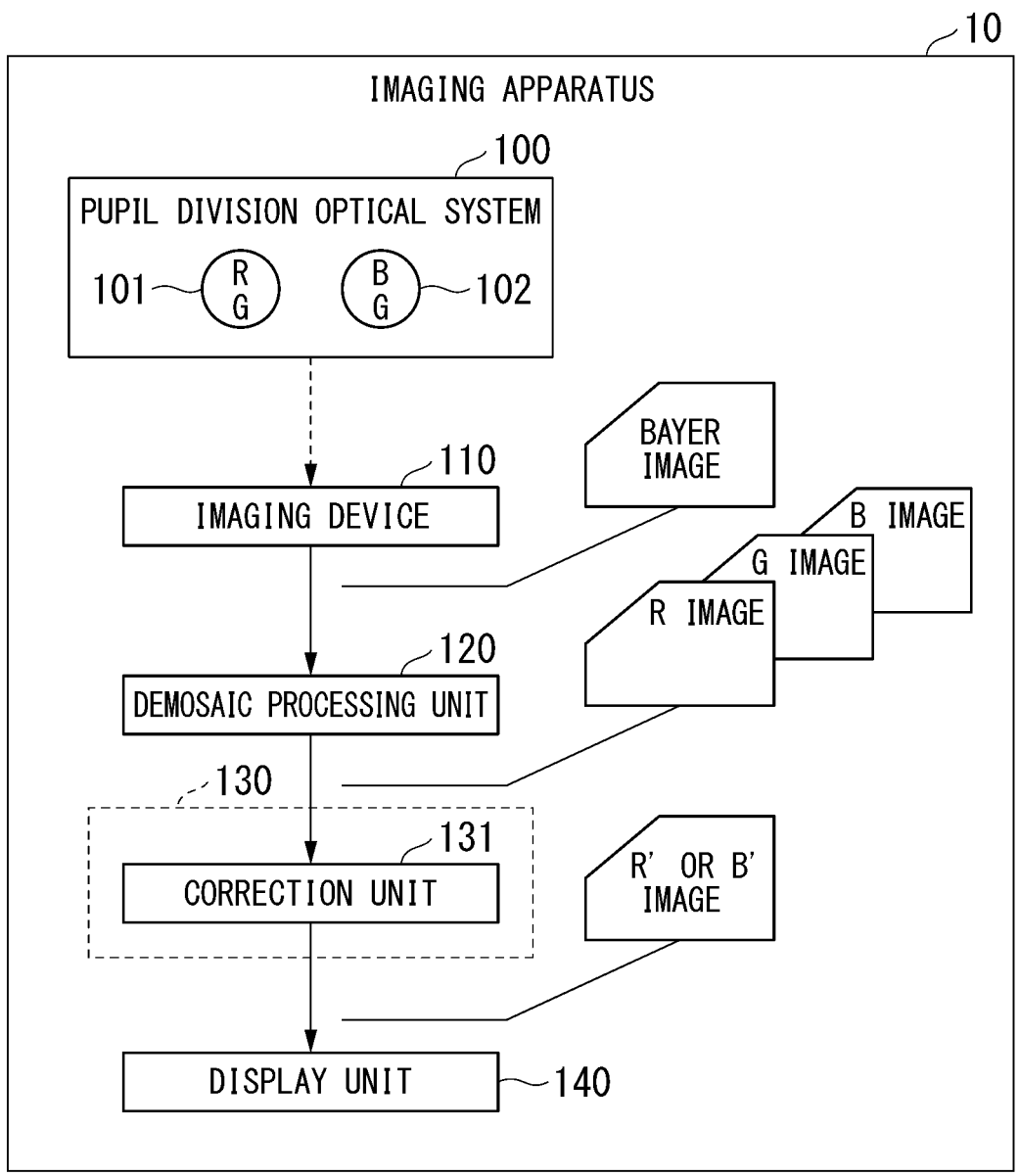
FIG. 1 is a block diagram showing a configuration of an imaging apparatus according to a first embodiment of the present invention.

FIG. 1 shows a configuration of an imaging apparatus 10 according to a first embodiment of the present invention. The imaging apparatus 10 is a digital still camera, a video camera, a mobile phone with a camera, a mobile information terminal with a camera, a personal computer with a camera, a surveillance camera, an endoscope, a digital microscope, or the like. As shown in FIG. 1, the imaging apparatus 10 includes a pupil division optical system 100, an imaging device 110, a demosaic processing unit 120, a display image generation unit 130, and a display unit 140. The display image generation unit 130 includes a correction unit 131.

A schematic configuration of the imaging apparatus 10 will be described. The pupil division optical system 100 includes a first pupil 101 transmitting light of a first wavelength band and a second pupil 102 transmitting light of a second wavelength band different from the first wavelength band. The imaging device 110 captures an image of light transmitted through the pupil division optical system 100 and a first color filter having a first transmittance characteristic, captures an image of light transmitted through the pupil division optical system 100 and a second color filter having a second transmittance characteristic partially overlapping the first transmittance characteristic, and acquires and outputs a captured image. The correction unit 131 generates a monochrome correction image by correcting a value that is based on components overlapping between the first transmittance characteristic and the second transmittance characteristic for the captured image. The display unit 140 displays the monochrome correction image.

A detailed configuration of the information imaging apparatus 10 will be described. The first pupil 101 of the pupil division optical system 100 includes an RG filter transmitting light of wavelengths of R (red) and G (green). The second pupil 102 of the pupil division optical system 100 includes a BG filter transmitting light of wavelengths of B (blue) and G (green).

Figure 2:
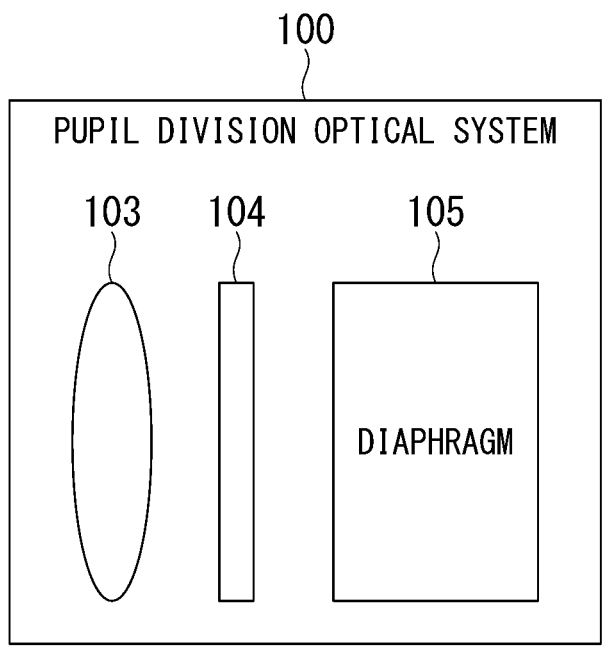
FIG. 2 is a block diagram showing a configuration of a pupil division optical system according to the first embodiment of the present invention.

FIG. 2 shows a configuration of the pupil division optical system 100. As shown in FIG. 2, the pupil division optical system 100 includes a lens 103, a band limiting filter 104, and a diaphragm 105. For example, the lens 103 is typically constituted by a plurality of lenses in many cases. Only one lens is shown in FIG. 2 for brevity. The band limiting filter 104 is disposed on an optical path of light incident on the imaging device 110. For example, the band limiting filter 104 is disposed at the position of the diaphragm 105 or in the vicinity of the position. In the example shown in FIG. 2, the band limiting filter 104 is disposed between the lens 103 and the diaphragm 105. The diaphragm 105 adjusts brightness of light incident on the imaging device 110 by limiting the passing range of light that has passed through the lens 103.

Figure 3:
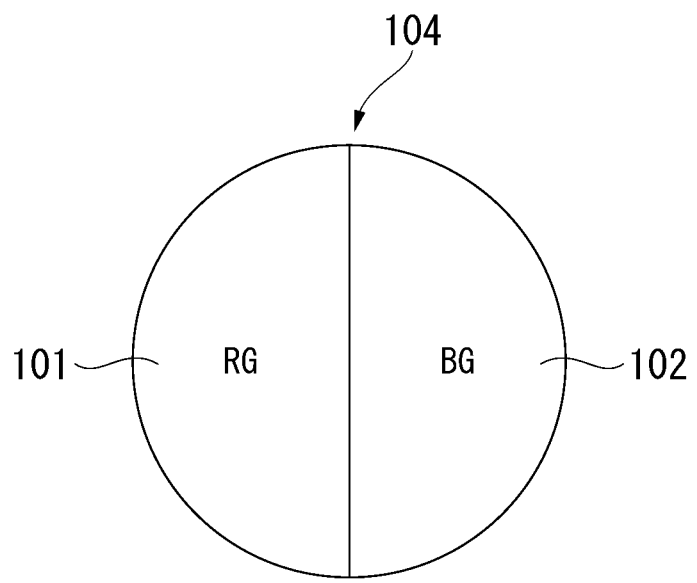
FIG. 3 is a block diagram showing a configuration of a band limiting filter according to the first embodiment of the present invention.

FIG. 3 shows a configuration of the band limiting filter 104. In the example shown in FIG. 3, when the band limiting filter 104 is seen from the side of the imaging device 110, the left half of the band limiting filter 104 constitutes the first pupil 101 and the right half of the band limiting filter 104 constitutes the second pupil 102. The first pupil 101 transmits light of wavelengths of R and G, and blocks light of wavelengths of B. The second pupil 102 transmits light of wavelengths of B and G, and blocks light of wavelengths of R.

The imaging device 110 is a photoelectric conversion element such as a charge coupled device (CCD) sensor and a complementary metal oxide semiconductor (CMOS) sensor of the XY-address-scanning type. As a configuration of the imaging device 110, there is a type such as a single-plate-primary-color Bayer array and a three-plate type using three sensors. Hereinafter, an embodiment of the present invention will be described with reference to examples in which a CMOS sensor (500×500 pixels and depth of 10 bits) of the single-plate-primary-color Bayer array is used.

The imaging device 110 includes a plurality of pixels. In addition, the imaging device 110 includes color filters including a first color filter, a second color filter, and a third color filter. The color filters are disposed in each pixel of the imaging device 110. For example, the first color filter is an R filter, the second color filter is a B filter, and the third color filter is a G filter. Light transmitted through the pupil division optical system 100 and the color filters is incident on each pixel of the imaging device 110. Light transmitted through the pupil division optical system 100 contains light transmitted through the first pupil 101 and light transmitted through the second pupil 102. The imaging device 110 acquires and outputs a captured image including a pixel value of a first pixel on which light transmitted through the first color filter is incident, a pixel value of a second pixel on which light transmitted through the second color filter is incident, and a pixel value of a third pixel on which light transmitted through the third color filter is incident.

Analog front end (AFE) processing such as correlated double sampling (CDS), analog gain control (AGC), and analog-to-digital converter (ADC) is performed by the imaging device 110 on an analog captured image signal generated through photoelectric conversion in the CMOS sensor. A circuit outside the imaging device 110 may perform AFE processing. A captured image (Bayer image) acquired by the imaging device 110 is transferred to the demosaic processing unit 120.

In the demosaic processing unit 120, a Bayer image is converted to an RGB image and a color image is generated. FIG. 4 shows a pixel arrangement of a Bayer image. R (red) and Gr (green) pixels are alternately disposed in odd rows and Gb (green) and B (blue) pixels are alternately disposed in even rows. R (red) and Gb (green) pixels are alternately disposed in odd columns and Gr (green) and B (blue) pixels are alternately disposed in even rows.

The demosaic processing unit 120 performs black-level correction (optical-black (OB) subtraction) on pixel values of a Bayer image. In addition, the demosaic processing unit 120 generates pixel values of adjacent pixels by copying pixel values of pixels. In this way, an RGB image having pixel values of each color in all the pixels is generated. For example, after the demosaic processing unit 120 performs OB subtraction on an R pixel value (R_00), the demosaic processing unit 120 copies a pixel value (R_00−OB). In this way, R pixel values in Gr, Gb, and B pixels adjacent to an R pixel are interpolated. FIG. 5 shows a pixel arrangement of an R image.

Similarly, after the demosaic processing unit 120 performs OB subtraction on a Gr pixel value (Gr_01), the demosaic processing unit 120 copies a pixel value (Gr_01−OB). In addition, after the demosaic processing unit 120 performs OB subtraction on a Gb pixel value (Gb_10), the demosaic processing unit 120 copies a pixel value (Gb_10−OB). In this way, G pixel values in an R pixel adjacent to a Gr pixel and in a B pixel adjacent to a Gb pixel are interpolated. FIG. 6 shows a pixel arrangement of a G image.

Similarly, after the demosaic processing unit 120 performs OB subtraction on a B pixel value (B_11), the demosaic processing unit 120 copies a pixel value (B_11−OB). In this way, B pixel values in R, Gr, and Gb pixels adjacent to a B pixel are interpolated. FIG. 7 shows a pixel arrangement of a B image.

The demosaic processing unit 120 generates a color image (RGB image) including an R image, a G image, and a B image through the above-described processing. A specific method of demosaic processing is not limited to the above-described method. Filtering processing may be performed on a generated RGB image. An RGB image generated by the demosaic processing unit 120 is transferred to the display image generation unit 130.

Figure 8:
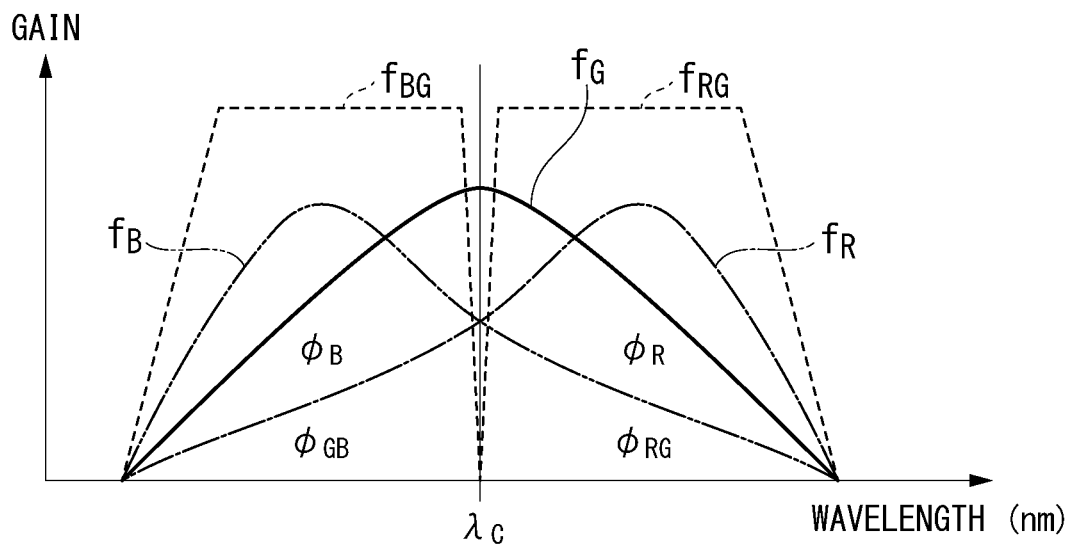
FIG. 8 is a diagram showing an example of spectral characteristics of an RG filter of a first pupil, a BG filter of a second pupil, and color filters of an imaging device in the first embodiment of the present invention.

Details of processing performed by the correction unit 131 of the display image generation unit 130 will be described. FIG. 8 shows an example of spectral characteristics (transmittance characteristics) of an RG filter of the first pupil 101, a BG filter of the second pupil 102, and color filters of the imaging device 110. The horizontal axis in FIG. 8 represents a wavelength λ [nm] and the vertical axis represents gain. A line $f_{RG}$ represents spectral characteristics of the RG filter. A line $f_{BG}$ represents spectral characteristics of the BG filter. A wavelength $\lambda_C$ is the boundary between the spectral characteristics of the RG filter and the spectral characteristics of the BG filter. The RG filter transmits light of a wavelength band of longer wavelengths than the wavelength $\lambda_C$. The BG filter transmits light of a wavelength band of shorter wavelengths than the wavelength $\lambda_C$. A line $f_R$ represents spectral characteristics (first spectral characteristics) of an R filter of the imaging device 110. A line $f_G$ represents spectral characteristics of a G filter of the imaging device 110. Since the filtering characteristics of a Gr filter and a Gb filter are almost the same, the Gr filter and the Gb filter are shown as a G filter. A line $f_B$ represents spectral characteristics (second spectral characteristics) of a B filter of the imaging device 110. Spectral characteristics of the filters of the imaging device 110 overlap.

An area between the line $f_R$ and the line $f_B$ in an area of longer wavelengths than the wavelength $\lambda_C$ in the spectral characteristics shown by the line $f_R$ is defined as an area $\varphi_R$. An area of longer wavelengths than the wavelength $\lambda_C$ in the spectral characteristics shown by the line $f_B$ is defined as an area $\varphi_{RG}$. An area between the line $f_B$ and the line $f_R$ in an area of shorter wavelengths than the wavelength $\lambda_C$ in the spectral characteristics shown by the line $f_B$ is defined as an area $\varphi_B$. An area of shorter wavelengths than the wavelength $\lambda_C$ in the spectral characteristics shown by the line $f_R$ is defined as an area $\varphi_{GB}$.

In a method in which a phase difference is acquired on the basis of an R image and a B image, for example, the difference between a phase of R (red) information and a phase of B (blue) information is acquired. R information is acquired through photoelectric conversion in R pixels of the imaging device 110 in which R filters are disposed. The R information includes information of the area $\varphi_B$, the area $\varphi_{RG}$, and the area $\varphi_{GB}$ in FIG. 8. Information of the area $\varphi_R$ and the area $\varphi_{RG}$ is based on light transmitted through the RG filter of the first pupil 101. Information of the area $\varphi_{GB}$ is based on light transmitted through the BG filter of the second pupil 102. Information of the area $\varphi_{GB}$ in the R information is based on components overlapping between the spectral characteristics of the R filter and the spectral characteristics of the B filter. Since the area $\varphi_{GB}$ is an area of the shorter wavelengths than the wavelength $\lambda_C$, the information of the area $\varphi_{GB}$ is B information that causes double images due to color shift. Since this information causes distortion of a waveform of the R image and occurrence of double images, this information is undesirable for the R information.

On the other hand, B information is acquired through photoelectric conversion in B pixels of the imaging device 110 in which B filters are disposed. The B information includes information of the area $\varphi_B$, the area $\varphi_{RG}$, and the area $\varphi_{GB}$ in FIG. 8. Information of the area $\varphi_B$ and the area $\varphi_{GB}$ is based on light transmitted through the BG filter of the second pupil 102. Information of the area $\varphi_{RG}$ in the B information is based on components overlapping between the spectral characteristics of the B filter and the spectral characteristics of the R filter. Information of the area $\varphi_{RG}$ is based on light transmitted through the RG filter of the first pupil 101. Since the area $\varphi_{RG}$ is an area of the longer wavelengths than the wavelength $\lambda_C$, the information of the area $\varphi_{RG}$ is R information that causes double images due to color shift. Since this information causes distortion of a waveform of the B image and occurrence of double images, this information is undesirable for the B information.

Correction is performed through which the information of the area $\varphi_{GB}$ including blue information is reduced in red information and the information of the area $\varphi_{RG}$ including red information is reduced in blue information. The correction unit 131 performs correction processing on the R image and the B image. In other words, the correction unit 131 reduces the information of the area $\varphi_{GB}$ in red information and reduces the information of the area $\varphi_{RG}$ in blue information.

Figure 9:
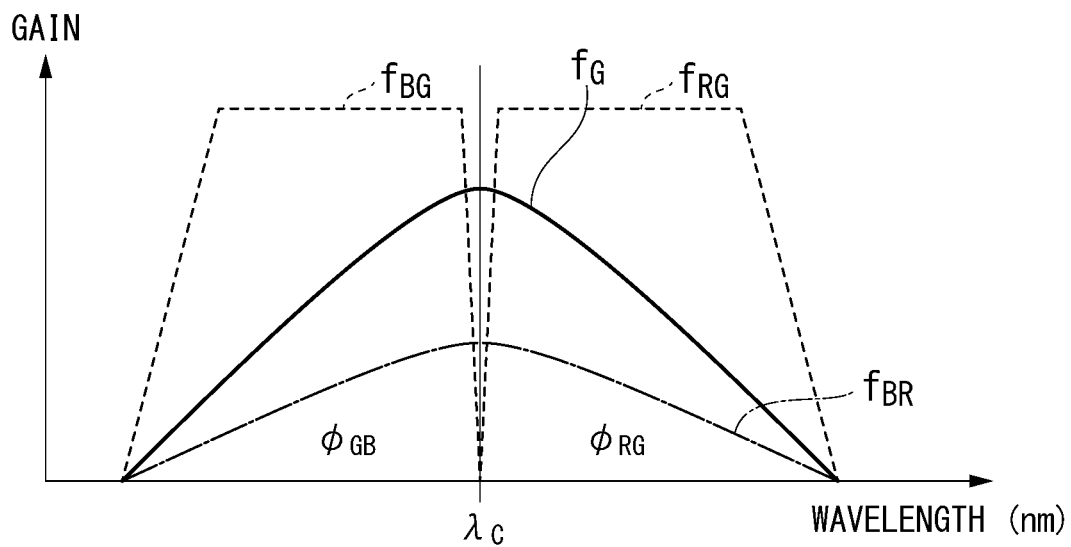
FIG. 9 is a diagram showing an example of spectral characteristics of an RG filter of a first pupil, a BG filter of a second pupil, and color filters of an imaging device in the first embodiment of the present invention.

FIG. 9 is a diagram similar to FIG. 8. In FIG. 9, a line $f_{BR}$ represents the area $\varphi_{GB}$ and the area $\varphi_{RG}$ in FIG. 8. Spectral characteristics of the G filter shown by the line $f_G$ and spectral characteristics shown by the line $f_{BR}$ are typically similar. The correction unit 131 performs correction processing by using this feature. The correction unit 131 calculates red information and blue information by using Expression (1) and Expression (2) in the correction processing.

$$R' = R - \alpha \times G \quad (1)$$

$$B' = B - \beta \times G \quad (2)$$

In Expression (1), R is red information before the correction processing is performed and R' is red information after the correction processing is performed. In Expression (2), B is blue information before the correction processing is performed and B' is blue information after the correction processing is performed. In this example, $\alpha$ and $\beta$ are larger than 0 and smaller than 1. $\alpha$ and $\beta$ are set in accordance with the spectral characteristics of the imaging device 110. In a case where the imaging apparatus 10 includes a light source for illumination, $\alpha$ and $\beta$ are set in accordance with the spectral characteristics of the imaging device 110 and spectral characteristics of the light source. For example, a and 13 are stored in a memory not shown.

A value that is based on components overlapping between the spectral characteristics of the R filter and the spectral characteristics of the B filter is corrected through the operation shown in Expression (1) and Expression (2). The correction unit 131 generates an image (monochrome correction image) corrected as described above. The monochrome correction image includes a value that is based on one of the first transmittance characteristic and the second transmittance characteristic. The correction unit 131 outputs the monochrome correction image by outputting any one of a generated R' image and a generated B' image. For example, the correction unit 131 outputs the R' image. In the first embodiment, any one of the R' image and the B' image is output to the display unit 140. The correction unit 131 may generate the R' image and the B' image and output only any one of the generated R' image and the generated B' image. Alternatively, the correction unit 131 may generate only predetermined one of the R' image and the B' image.

High-quality image processing, i.e., γ correction, scaling processing, edge enhancement, and low-pass filtering processing may be performed on the monochrome correction image (R' image) output from the correction unit 131. In scaling processing, bi-cubic, Nearest neighbor, and the like are used. In low-pass filtering processing, folding distortion (aliasing) is corrected.

The demosaic processing unit 120 and the display image generation unit 130 may be constituted by an application specific integrated circuit (ASIC), a field-programmable gate array (FPGA), a microprocessor, and the like. For example, the demosaic processing unit 120 and the display image generation unit 130 may be constituted by an ASIC and an embedded processor. The demosaic processing unit 120 and the display image generation unit 130 may be constituted by hardware, software, firmware, or combinations thereof other than the above.

The display unit 140 is a transparent type liquid crystal display (LCD) requiring backlight, a self-light-emitting type electro luminescence (EL) element (organic EL), and the like. For example, the display unit 140 is constituted as a transparent type LCD and includes a driving unit necessary for LCD driving. The driving unit generates a driving signal and drives an LCD by using the driving signal.

The imaging apparatus 10 according to the first embodiment includes the correction unit 131 and thus can suppress double images due to color shift of an image. In addition, since the imaging apparatus 10 includes the display unit 140 that displays a monochrome correction image, visibility of an image can be improved. Even when a user observes an image in a method in which a phase difference is acquired on the basis of an R image and a B image, the user can observe an image in which double images due to color shift are suppressed and visibility is improved. Since the display unit 140 displays a monochrome correction image, the amount of information output to the display unit 140 is reduced. For this reason, power consumption of the display unit 140 can be reduced.

Second Embodiment

Figure 10:
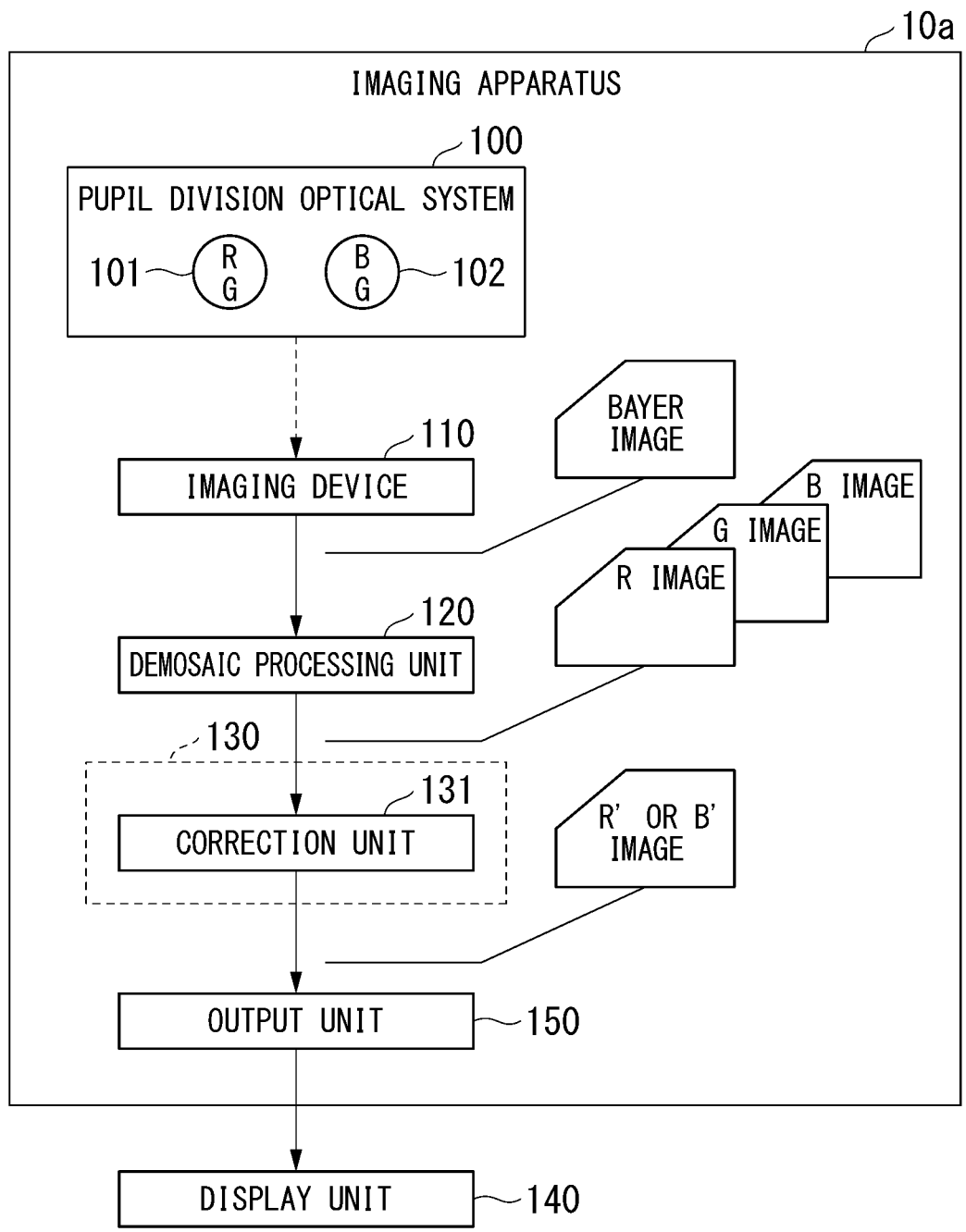
FIG. 10 is a block diagram showing a configuration of an imaging apparatus according to a second embodiment of the present invention.

FIG. 10 shows a configuration of an imaging apparatus 10a according to a second embodiment of the present invention. In terms of the configuration shown in FIG. 10, differences from the configuration shown in FIG. 1 will be described.

The imaging apparatus 10a does not include the display unit 140. The display unit 140 is constituted independently of the imaging apparatus 10a. The imaging apparatus 10a includes an output unit 150 in addition to the configurations excluding the display unit 140 out of the configurations of the imaging apparatus 10 shown in FIG. 1. The output unit 150 is an output circuit that outputs the monochrome correction image generated by the correction unit 131 to the display unit 140. For example, the output unit 150 is a communicator that performs wired or wireless communication with the display unit 140.

In terms of points other than the above, the configuration shown in FIG. 10 is similar to the configuration shown in FIG. 1.

The imaging apparatus 10a according to the second embodiment can suppress double images due to color shift of an image and improve visibility of an image as with the imaging apparatus 10 according to the first embodiment. Since the display unit 140 is independent of the imaging apparatus 10a, the imaging apparatus 10a can be miniaturized. In addition, by transferring a monochrome correction image, the frame rate when an image is transferred to the display unit 140 increases and the bit rate is reduced compared to a color image.

Third Embodiment

Figure 11:
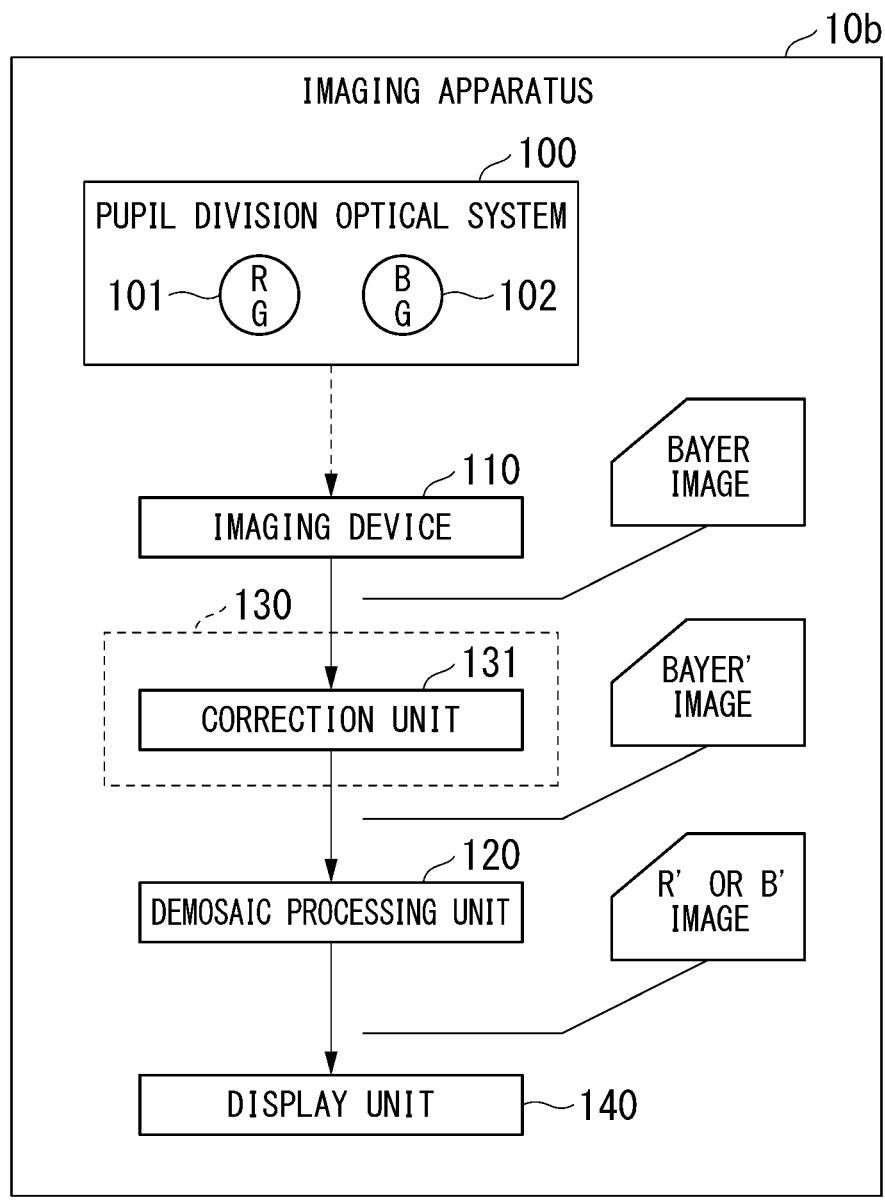
FIG. 11 is a block diagram showing a configuration of an imaging apparatus according to a third embodiment of the present invention.

FIG. 11 shows a configuration of an imaging apparatus 10b according to a third embodiment of the present invention. In terms of the configuration shown in FIG. 11, differences from the configuration shown in FIG. 1 will be described.

In the imaging apparatus 10b, positions of the demosaic processing unit 120 and the display image generation unit 130 are different from those in the imaging apparatus 10 shown in FIG. 1. A Bayer image output from the imaging device 110 is input to the display image generation unit 130. In the display image generation unit 130, the correction unit 131 generates a Bayer' image that is a correction image by performing correction processing and OB subtraction on the Bayer image. The correction image includes a value that is based on the first transmittance characteristic and a value that is based on the second transmittance characteristic.

Specifically, the correction unit 131 performs OB subtraction on pixel values of the Bayer image. In addition, the correction unit 131 generates pixel values of adjacent pixels by copying pixel values of pixels. In this way, an RGB image having pixel values of each color in all the pixels is generated. For example, after the correction unit 131 performs OB subtraction on an R pixel value (R_00), the correction unit 131 copies a pixel value (R_00−OB). In this way, R pixel values in Gr, Gb, and B pixels adjacent to an R pixel are interpolated.

Similarly, after the correction unit 131 performs OB subtraction on a Gr pixel value (Gr_01), the correction unit 131 copies a pixel value (Gr_01−OB). In addition, after the correction unit 131 performs OB subtraction on a Gb pixel value (Gb_10), the correction unit 131 copies a pixel value (Gb_10−OB). In this way, G pixel values in an R pixel adjacent to a Gr pixel and in a B pixel adjacent to a Gb pixel are interpolated.

Similarly, after the correction unit 131 performs OB subtraction on a B pixel value (B_11), the correction unit 131 copies a pixel value (B_11−OB). In this way, B pixel values in R, Gr, and Gb pixels adjacent to a B pixel are interpolated.

The correction unit 131 generates a color image (RGB image) including an R image, a G image, and a B image through the above-described processing. Thereafter, the correction unit 131 generates an R' image in which double images due to color shift have been suppressed by correcting an R image on the basis of Expression (1). In addition, the correction unit 131 generates a B' image in which double images due to color shift have been suppressed by correcting a B image on the basis of Expression (2). The correction unit 131 generates an R' pixel value of the Bayer' image by extracting a pixel value at the same position as the position of an R pixel in the Bayer image from the R' image. In addition, the correction unit 131 generates Gr' and Gb' pixel values of the Bayer' image by extracting pixel values at the same positions as the positions of Gr and Gb pixels in the Bayer image from a G image. In addition, the correction unit 131 generates a B' pixel value of the Bayer' image by extracting a pixel value at the same position as the position of a B pixel in the Bayer image from the B' image.

FIG. 12 shows a pixel arrangement of a Bayer' image. An arrangement of R' (red), Gr' (green), Gb' (green), and B' (blue) pixels in the Bayer' image is similar to that of R, Gr, Gb, and B pixels in the Bayer image. The correction unit 131 outputs the generated Bayer' image to the demosaic processing unit 120. Needless to say, high-quality image processing and the like performed on an existing Bayer image may be performed on a Bayer' image before the Bayer' image is input to the demosaic processing unit 120.

The demosaic processing unit 120 generates at least one of an R' image and a B' image by performing demosaic processing on a Bayer' image. In other words, the demosaic processing unit 120 interpolates R' pixel values of Gr', Gb', and B' pixels adjacent to an R' pixel by copying an R' pixel value. Alternatively, the demosaic processing unit 120 interpolates B' pixel values of R', Gr', and Gb' pixels adjacent to a B' pixel by copying a B' pixel value. The demosaic processing unit 120 outputs a monochrome correction image by outputting any one of the R' image and the B' image to the display unit 140. For example, the demosaic processing unit 120 outputs the R' image. In the third embodiment, any one of the R' image and the B' image is output to the display unit 140. The demosaic processing unit 120 may generate the R' image and the B' image and output only any one of the generated R' image and the generated B' image. Alternatively, the demosaic processing unit 120 may generate only one of the R' image and the B' image that is determined in advance. The demosaic processing unit 120 constitutes an image processing unit that generates a monochrome correction image by processing a correction image generated by the correction unit 131. High-quality image processing such as γ correction may be performed on a monochrome correction image generated by the demosaic processing unit 120.

In terms of points other than the above, the configuration shown in FIG. 11 is similar to the configuration shown in FIG. 1.

The display unit 140 may be constituted independently of the imaging apparatus 10b. In this case, the imaging apparatus 10b includes the output unit 150. The output unit 150 outputs a processed image generated by processing a monochrome correction image to the display unit 140. The display image generation unit 130 may be disposed at the former stage of the demosaic processing unit 120.

The imaging apparatus 10b according to the third embodiment can suppress double images due to color shift of an image and improve visibility of an image as with the imaging apparatus 10 according to the first embodiment. In addition, high-quality image processing and the like performed on an existing Bayer image can also be performed on a Bayer' image before the Bayer' image is input to the demosaic processing unit 120.

Fourth Embodiment

Figure 13:
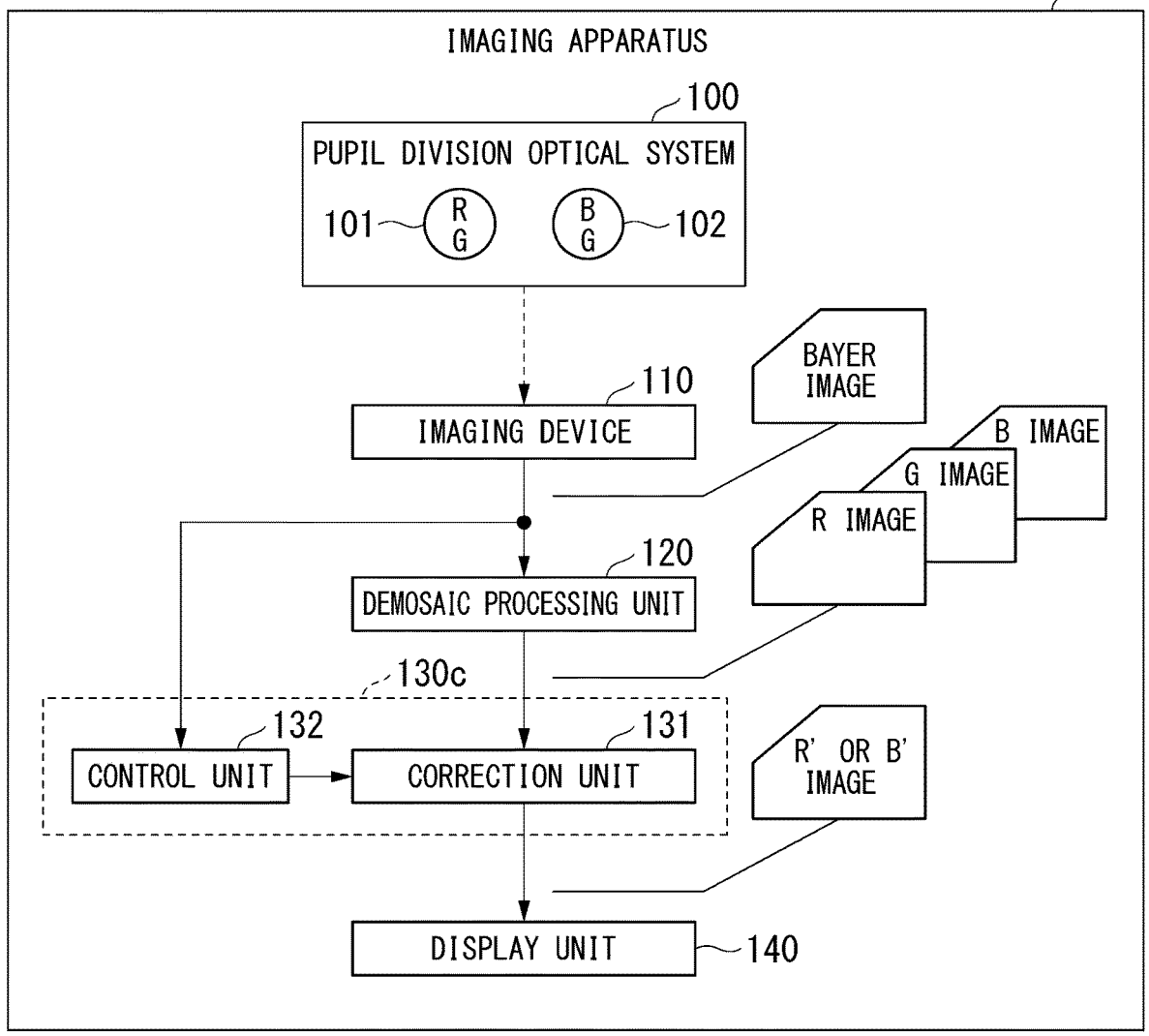
FIG. 13 is a block diagram showing a configuration of an imaging apparatus according to a fourth embodiment of the present invention.

FIG. 13 shows a configuration of an imaging apparatus 10c according to a fourth embodiment of the present invention. In terms of the configuration shown in FIG. 13, differences from the configuration shown in FIG. 1 will be described.

In the imaging apparatus 10c, the display image generation unit 130 shown in

FIG. 1 is changed to a display image generation unit 130c. The display image generation unit 130c includes a correction unit 131 and a control unit 132. The control unit 132 instructs the correction unit 131 to generate at least one of a first monochrome correction image and a second monochrome correction image. The first monochrome correction image is a monochrome correction image generated by correcting a value that is based on components overlapping between a first transmittance characteristic and a second transmittance characteristic for a captured image having components that are based on the first transmittance characteristic. The second monochrome correction image is a monochrome correction image generated by correcting a value that is based on components overlapping between the first transmittance characteristic and the second transmittance characteristic for the captured image having components that are based on the second transmittance characteristic. The correction unit 131 generates at least one of the first monochrome correction image and the second monochrome correction image in accordance with an instruction from the control unit 132. The control unit 132 is constituted by a microprocessor and the like. For example, the first monochrome correction image is an R' image. For example, the second monochrome correction image is a B' image.

The control unit 132 instructs the correction unit 131 to generate at least one of the first monochrome correction image and the second monochrome correction image in accordance with a result of analyzing the captured image. In a first example, the control unit 132 instructs the correction unit 131 to generate at least one of the first monochrome correction image and the second monochrome correction image in accordance with a histogram of the captured image. In a second example, the control unit 132 instructs the correction unit 131 to generate at least one of the first monochrome correction image and the second monochrome correction image in accordance with contrast of the captured image.

In terms of points other than the above, the configuration shown in FIG. 13 is similar to the configuration shown in FIG. 1.

Figure 14:
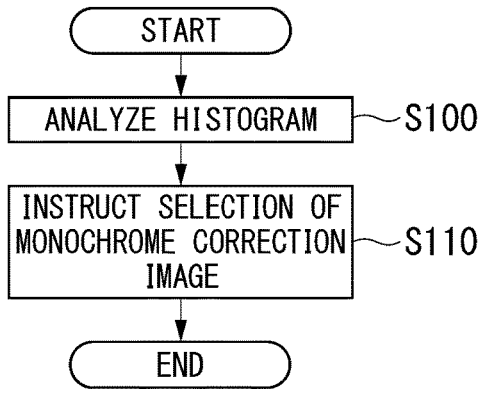
FIG. 14 is a flow chart showing a procedure of an operation of a control unit according to the fourth embodiment of the present invention.

FIG. 14 shows a procedure of an operation of the control unit 132 in the first example. A Bayer image that is a captured image acquired by the imaging device 110 is input to the control unit 132. The control unit 132 analyzes a histogram of the Bayer image (step S100). After step S100, the control unit 132 instructs the correction unit 131 to generate a monochrome correction image determined through histogram analysis (step S110).

Figure 15:
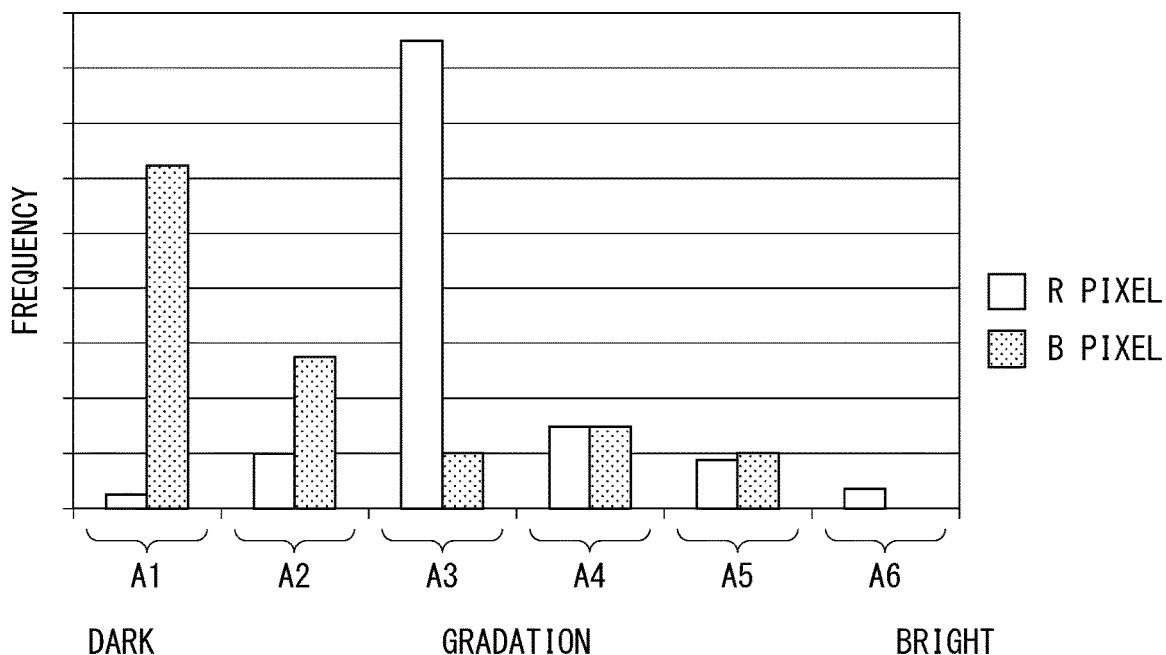
FIG. 15 is a diagram showing an example of a histogram of a Bayer image in the fourth embodiment of the present invention.

Details of processing in step S100 will be described. The control unit 132 generates a histogram of pixel values of pixels for each color in the Bayer image. FIG. 15 shows an example of a histogram of the Bayer image. The horizontal axis in FIG. 15 represents gradation of a pixel value and the vertical axis in FIG. 15 represents a frequency. In FIG. 15, a histogram of pixel values of a plurality of R pixels in the Bayer image and a histogram of pixel values of a plurality of B pixels in the Bayer image are shown. 10 bits of depth (0 to 1023) of the imaging device 110 are classified as an area A1 to an area A6. The area A1 is an area that corresponds to pixel values of 0 to 169. An area A2 is an area that corresponds to pixel values of 170 to 339. An area A3 is an area that corresponds to pixel values of 340 to 509. An area A4 is an area that corresponds to pixel values of 510 to 679. An area A5 is an area that corresponds to pixel values of 680 to 849. The area A6 is an area that corresponds to pixel values of 850 to 1023. Pixels having a pixel value of an area on the more left side are dark and pixels having a pixel value of an area on the more right side are bright. In the example shown in FIG. 15, frequencies of R pixels are distributed in brighter areas compared to frequencies of B pixels. For this reason, it can be determined that an R image has a higher signal-to-noise ratio (SNR) than a B image. The control unit 132 determines that a monochrome correction image to be generated by the correction unit 131 is an R' image.

In the first example, the control unit 132 generates a histogram of pixel values of a plurality of R pixels and a histogram of pixel values of a plurality of B pixels. The control unit 132 instructs the correction unit 131 to generate a monochrome correction image corresponding to pixels with higher frequencies of larger pixel values out of R pixels and B pixels.

Figure 16:
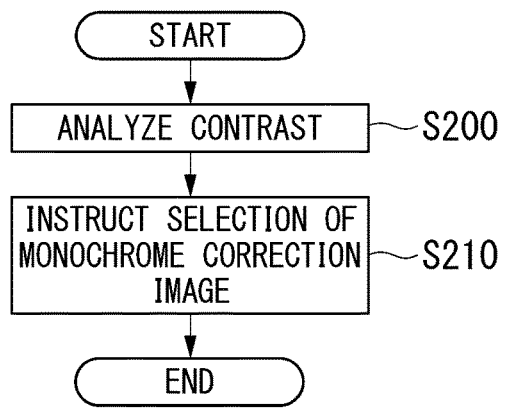
FIG. 16 is a flow chart showing a procedure of an operation of a control unit according to the fourth embodiment of the present invention.

FIG. 16 shows a procedure of an operation of the control unit 132 in the second example. A Bayer image that is a captured image acquired by the imaging device 110 is input to the control unit 132. The control unit 132 analyzes contrast of the Bayer image (step S200). After step S200, the control unit 132 instructs the correction unit 131 to generate a monochrome correction image determined through contrast analysis (step S210).

Details of processing in step S200 will be described. The control unit 132 generates a histogram similar to that generated in the first example. For example, a histogram shown in FIG. 15 is generated. The control unit 132 calculates contrast of a Bayer image on the basis of the histogram. In the example shown in FIG. 15, R pixels are distributed from an area A6 to an area A1. On the other hand, B pixels are distributed from an area A5 to the area A1. When contrast is defined as a value acquired by dividing the maximum luminance value (maximum pixel value) by the minimum luminance value (minimum pixel value), contrast of the R pixels is higher than that of the B pixels. For this reason, the control unit 132 determines an R' image as a monochrome correction image to be generated by the correction unit 131.

In the second example, the control unit 132 calculates contrast of pixel values of a plurality of R pixels and contrast of pixel values of a plurality of B pixels. The control unit 132 instructs the correction unit 131 to generate a monochrome correction image corresponding to pixels with higher contrast out of the R pixels and the B pixels.

The display unit 140 may be constituted independently of the imaging apparatus 10c. In this case, the imaging apparatus 10c includes the output unit 150. The output unit 150 outputs a monochrome correction image generated by the correction unit 131 to the display unit 140. The display image generation unit 130c may be disposed at the former stage of the demosaic processing unit 120.

The imaging apparatus 10c according to the fourth embodiment can suppress double images due to color shift of an image and improve visibility of an image as with the imaging apparatus 10 according to the first embodiment.

In the first example, the control unit 132 instructs the correction unit 131 to generate a monochrome correction image determined in accordance with a histogram of a captured image. In this way, the imaging apparatus 10c can generate an image in which double images due to color shift are suppressed and an SNR is high.

In the second example, the control unit 132 instructs the correction unit 131 to generate a monochrome correction image determined in accordance with contrast of a captured image. In this way, the imaging apparatus 10c can generate an image in which double images due to color shift are suppressed and contrast is high.

Fifth Embodiment

Figure 17:
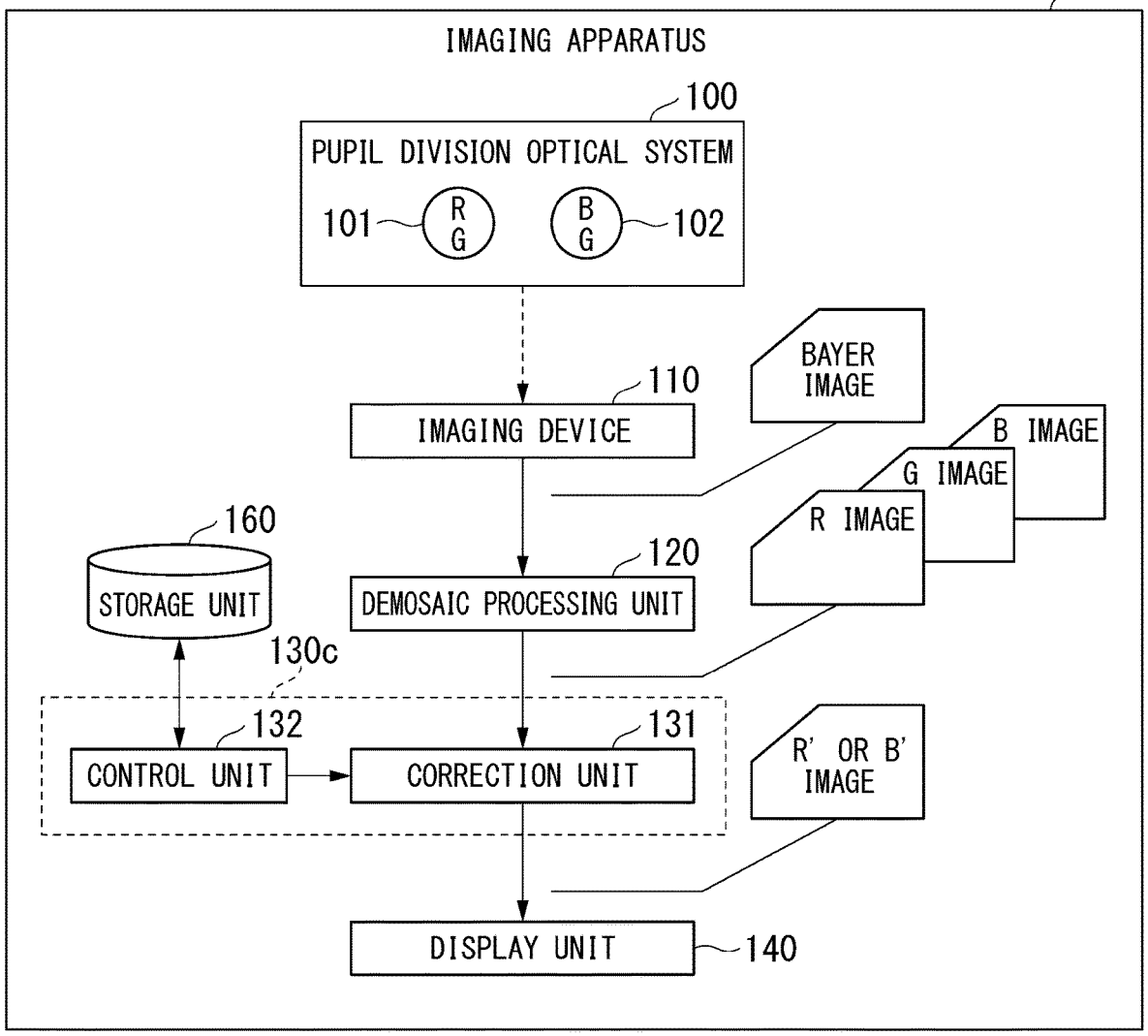
FIG. 17 is a block diagram showing a configuration of an imaging apparatus according to a fifth embodiment of the present invention.

FIG. 17 shows a configuration of an imaging apparatus 10d according to a fifth embodiment of the present invention. In terms of the configuration shown in FIG. 17, differences from the configuration shown in FIG. 13 will be described.

The imaging apparatus 10d includes a storage unit 160 in addition to the configuration of the imaging apparatus 10c shown in FIG. 13. The imaging apparatus 10d is used for the purpose of acquiring a captured image of a predetermined subject. The control unit 132 instructs the correction unit 131 to generate at least one of a first monochrome correction image and a second monochrome correction image in accordance with spectral characteristics of the subject. The storage unit 160 stores spectral characteristic data that represent spectral characteristics of the subject. The storage unit 160 may store a plurality of pieces of spectral characteristic data different by subjects. The storage unit 160 is a non-volatile memory such as a read only memory (ROM). The storage unit 160 may be constituted independently of the imaging apparatus 10d.

In terms of points other than the above, the configuration shown in FIG. 17 is similar to the configuration shown in FIG. 13.

Figure 18:
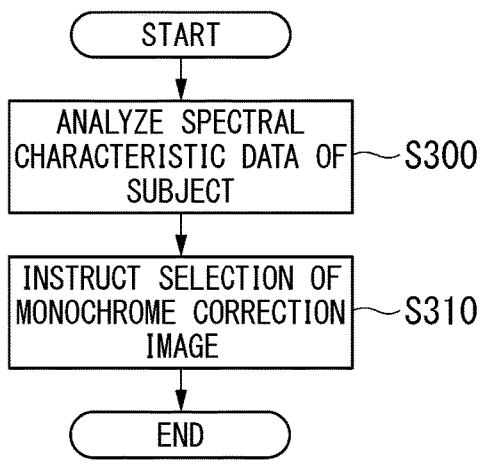
FIG. 18 is a flow chart showing a procedure of an operation of a control unit according to the fifth embodiment of the present invention.

FIG. 18 shows a procedure of an operation of the control unit 132. A user selects a subject by using a user interface not shown. Information of the subject selected by a user is input to the display image generation unit 130c through a system controller not shown. The control unit 132 reads spectral characteristic data of the subject selected by a user from the storage unit 160 and analyzes the spectral characteristic data (step S300). After step S300, the control unit 132 instructs the correction unit 131 to generate a monochrome correction image determined through analyzing the spectral characteristic data (step S310).

Figure 19:
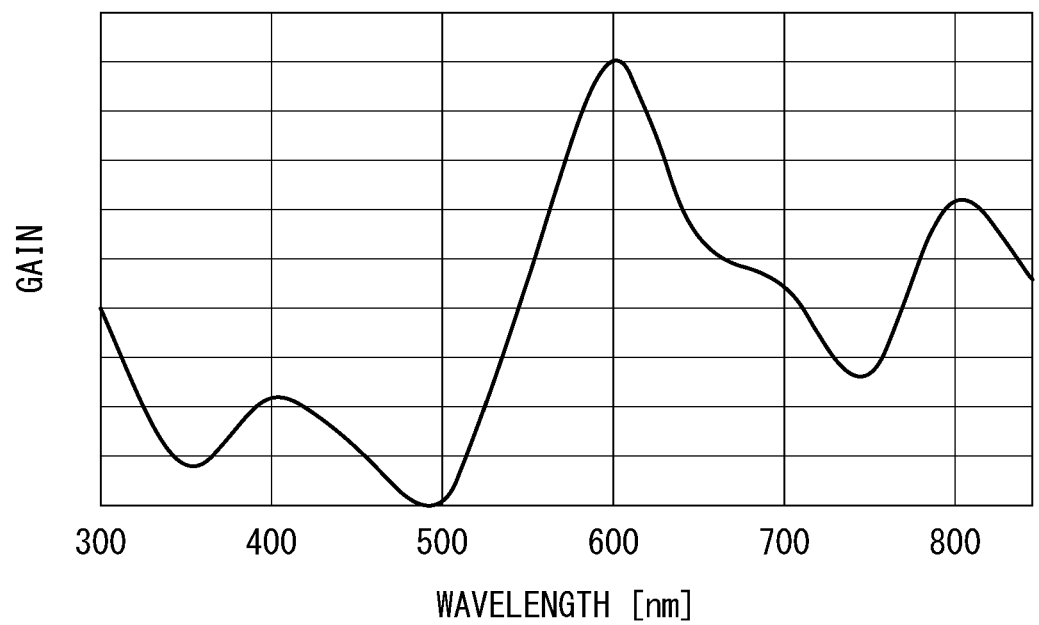
FIG. 19 is a diagram showing an example of spectral characteristics of a subject in the fifth embodiment of the present invention.

Details of processing in step S300 will be described. The control unit 132 instructs the correction unit 131 to generate a monochrome correction image corresponding to pixels in which light of wavelengths having higher gain in spectral characteristics of a subject is incident. FIG. 19 shows an example of spectral characteristics of a subject. The horizontal axis in FIG. 19 represents a wavelength [nm] and the vertical axis represents gain. In the example shown in FIG. 19, gain in the vicinity of 600 [nm] is high. Gain of 600 [nm] in spectral characteristics of an R filter is higher than gain of 600 [nm] in spectral characteristics of a B filter. For this reason, the control unit 132 determines an R' image as a monochrome correction image to be generated by the correction unit 131.

The storage unit 160 may store identification information of a subject and correction image information. The correction image information represents which of an R' image and a B' image is to be a monochrome correction image. The identification information of a subject and the correction image information are associated with each other. A user selects a subject by using a user interface not shown. The control unit 132 instructs the correction unit 131 to generate a monochrome correction image corresponding to the subject selected by a user. Specifically, the control unit 132 reads information associated with the identification information of the subject selected by a user from the storage unit 160. The information read from the storage unit 160 represents which of an R' image and a B' image is to be a monochrome correction image. The control unit 132 instructs the correction unit 131 to generate a monochrome correction image corresponding to the information read from the storage unit 160. The amount of data is reduced compared to a case where the storage unit 160 stores spectral characteristic data of a subject.

The display unit 140 may be constituted independently of the imaging apparatus 10d. In this case, the imaging apparatus 10d includes the output unit 150. The output unit 150 outputs a monochrome correction image generated by the correction unit 131 to the display unit 140. The display image generation unit 130c may be disposed at the former stage of the demosaic processing unit 120.

The imaging apparatus 10d according to the fifth embodiment can suppress double images due to color shift of an image and improve visibility of an image as with the imaging apparatus 10 according to the first embodiment.

The control unit 132 instructs the correction unit 131 to generate a monochrome correction image determined in accordance with spectral characteristics of a subject. In this way, the imaging apparatus 10d can generate an image in which double images due to color shift are suppressed and an SNR is high.

Sixth Embodiment

Figure 20:
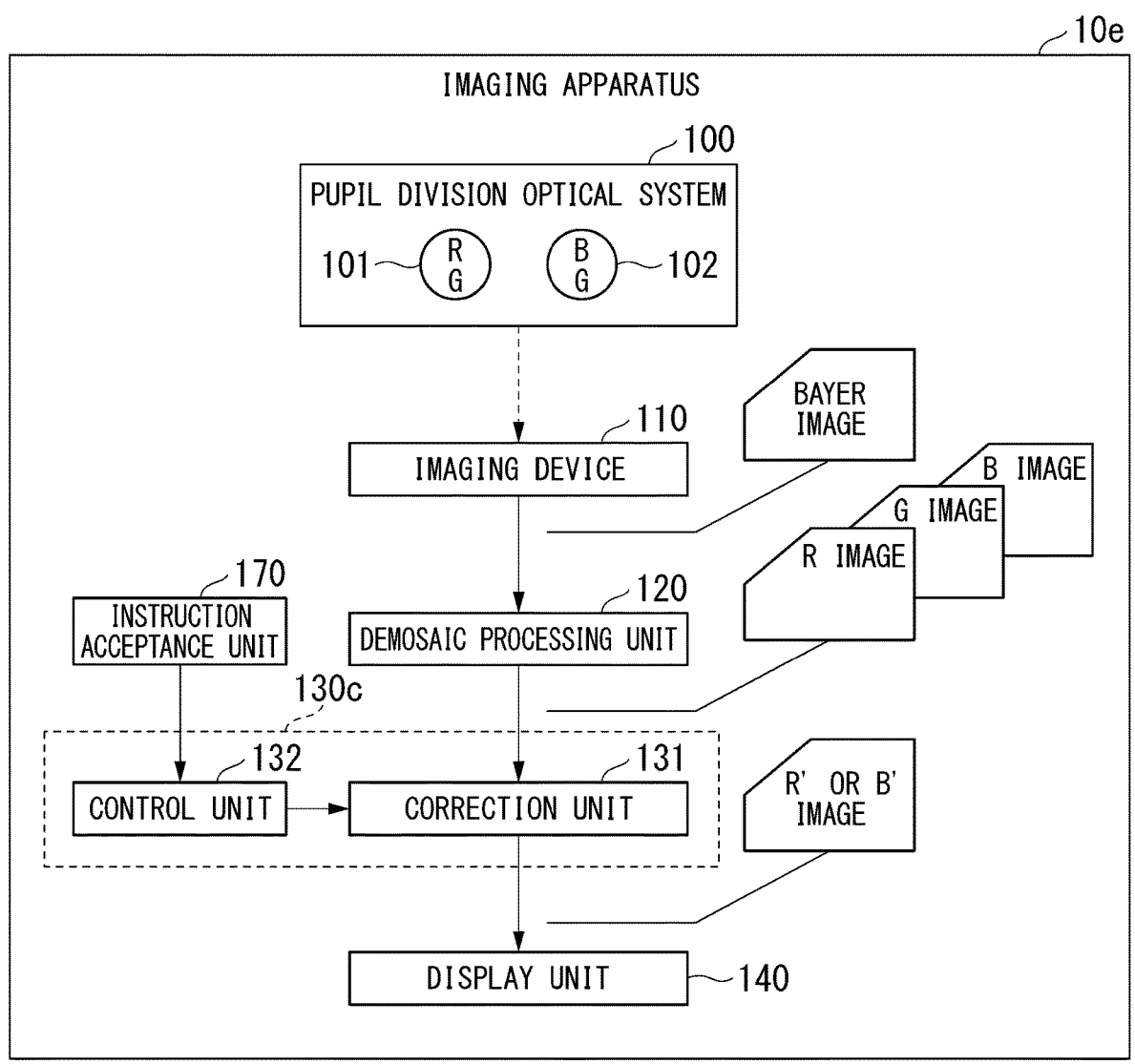
FIG. 20 is a block diagram showing a configuration of an imaging apparatus according to a sixth embodiment of the present invention.

FIG. 20 shows a configuration of an imaging apparatus 10e according to a sixth embodiment of the present invention. In terms of the configuration shown in FIG. 20, differences from the configuration shown in FIG. 13 will be described.

The imaging apparatus 10e includes an instruction acceptance unit 170 in addition to the configuration of the imaging apparatus 10c shown in FIG. 13. The control unit 132 determines which of an R' image and a B' image is to be a monochrome correction image in accordance with an instruction from a user. Information of a monochrome correction image instructed by a user is instructed to the correction unit 131. The instruction acceptance unit 170 accepts an instruction from a user. The instruction acceptance unit 170 constitutes a user interface including a button, a switch, a key, and the like. The instruction acceptance unit 170 may be constituted independently of the imaging apparatus 10e.

For example, a user inputs an instruction for selecting any one of an R' image and a B' image through the instruction acceptance unit 170. The control unit 132 instructs the correction unit 131 to generate a monochrome correction image represented by the instruction accepted by the instruction acceptance unit 170.

In terms of points other than the above, the configuration shown in FIG. 20 is similar to the configuration shown in FIG. 13.

The display unit 140 may be constituted independently of the imaging apparatus 10e. In this case, the imaging apparatus 10e includes the output unit 150. The output unit 150 outputs a monochrome correction image generated by the correction unit 131 to the display unit 140. The display image generation unit 130c may be disposed at the former stage of the demosaic processing unit 120.

The imaging apparatus 10e according to the sixth embodiment can suppress double images due to color shift of an image and improve visibility of an image as with the imaging apparatus 10 according to the first embodiment.

The control unit 132 instructs the correction unit 131 to generate a monochrome correction image determined in accordance with an instruction from a user. In this way, the imaging apparatus 10e can suppress double images due to color shift and improve visibility of an image in accordance with a user's preference.

Seventh Embodiment

Figure 21:
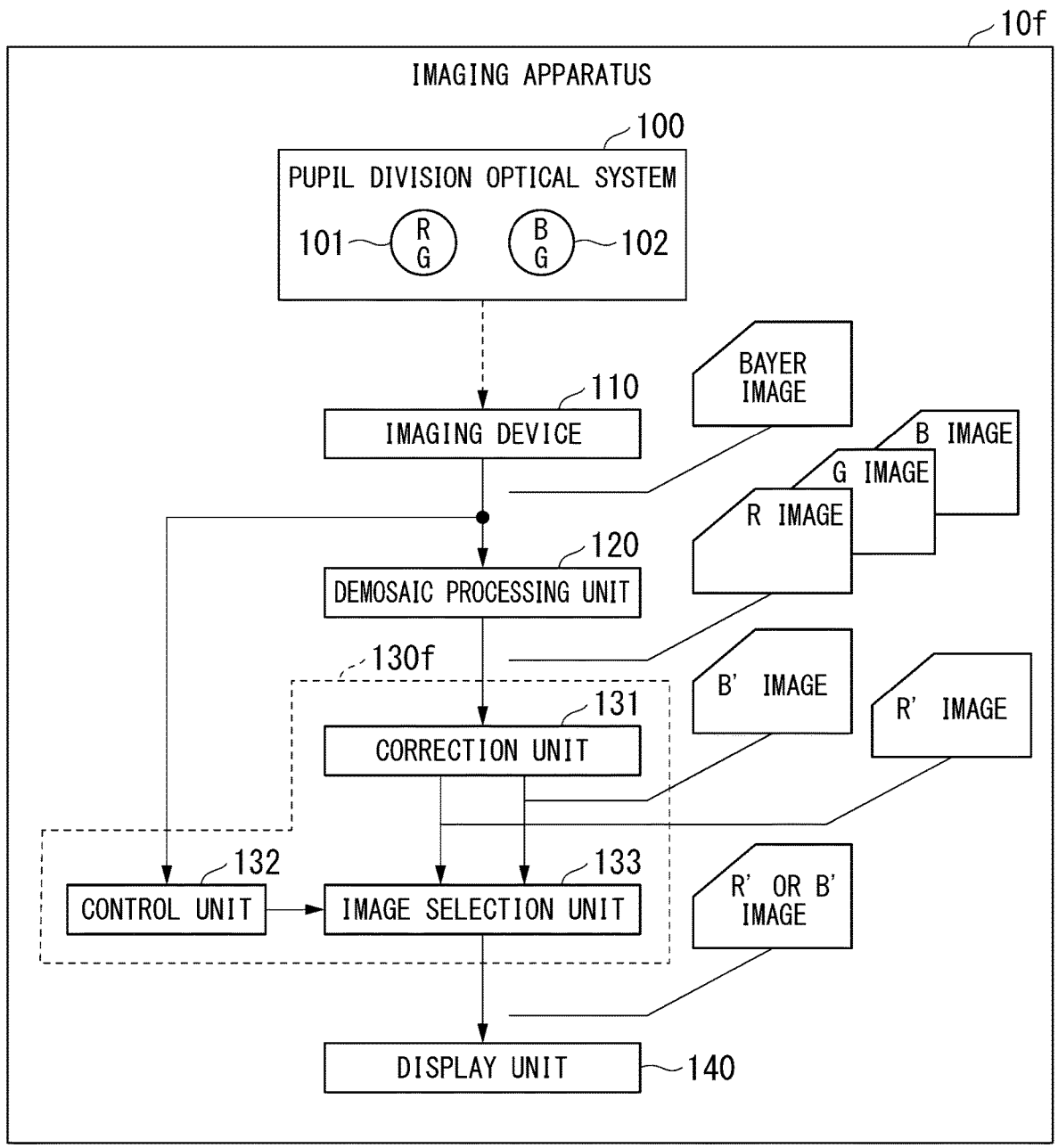
FIG. 21 is a block diagram showing a configuration of an imaging apparatus according to a seventh embodiment of the present invention.

FIG. 21 shows a configuration of an imaging apparatus 10f according to a seventh embodiment of the present invention. In terms of the configuration shown in FIG. 21, differences from the configuration shown in FIG. 1 will be described.

In the imaging apparatus 10f, the display image generation unit 130 shown in FIG. 1 is changed to a display image generation unit 130f. The display image generation unit 130f includes a correction unit 131, a control unit 132, and an image selection unit 133.

The correction unit 131 generates a first monochrome correction image and a second monochrome correction image in parallel with analysis of a captured image performed by the control unit 132. The first monochrome correction image is a monochrome correction image generated by correcting a value that is based on components overlapping between a first transmittance characteristic and a second transmittance characteristic for a captured image having components that are based on the first transmittance characteristic. The second monochrome correction image is a monochrome correction image generated by correcting a value that is based on components overlapping between the first transmittance characteristic and the second transmittance characteristic for the captured image having components that are based on the second transmittance characteristic. The control unit 132 instructs the image selection unit 133 to select at least one of the first monochrome correction image and the second monochrome correction image in accordance with a result of analyzing the captured image. The image selection unit 133 selects at least one of the first monochrome correction image and the second monochrome correction image out of monochrome correction images generated by the correction unit 131 and outputs the selected monochrome correction image.

For example, the correction unit 131 generates an R' image and a B' image and outputs the generated R' image and the generated B' image to the image selection unit 133. The R' image and the B' image generated by the correction unit 131 is input to the image selection unit 133. The control unit 132 instructs the image selection unit 133 to select any one of the R' image and the B' image in accordance with a result of analyzing a Bayer image that is a captured image. The image selection unit 133 selects an image instructed by the control unit 132 out of the R' image and the B' image generated by the correction unit 131 and outputs the selected image to the display unit 140.

In terms of points other than the above, the configuration shown in FIG. 21 is similar to the configuration shown in FIG. 1.

The display unit 140 may be constituted independently of the imaging apparatus 10f. In this case, the imaging apparatus 10f includes the output unit 150. The output unit 150 outputs a monochrome correction image selected by the image selection unit 133 to the display unit 140.

The imaging apparatus 10f according to the seventh embodiment can suppress double images due to color shift of an image and improve visibility of an image as with the imaging apparatus 10 according to the first embodiment.

In the imaging apparatus 10c shown in FIG. 13, the correction unit 131 waits for analysis of a captured image performed by the control unit 132. After accepting an instruction from the control unit 132, the correction unit 131 generates an R' image or a B' image represented by the instruction from the control unit 132. On the other hand, in the imaging apparatus 10f shown in FIG. 21, the correction unit 131 generates an R' image and a B' image without waiting for analysis of a captured image performed by the control unit 132. The control unit 132 analyzes a captured image while the correction unit 131 generates an R' image and a B' image. For this reason, a monochrome correction image is generated without waiting for an instruction from the control unit 132 and the monochrome correction image is output from the image selection unit 133 on the basis of the instruction from the control unit 132. For this reason, a delay time is shortened.

Eighth Embodiment

Figure 22:
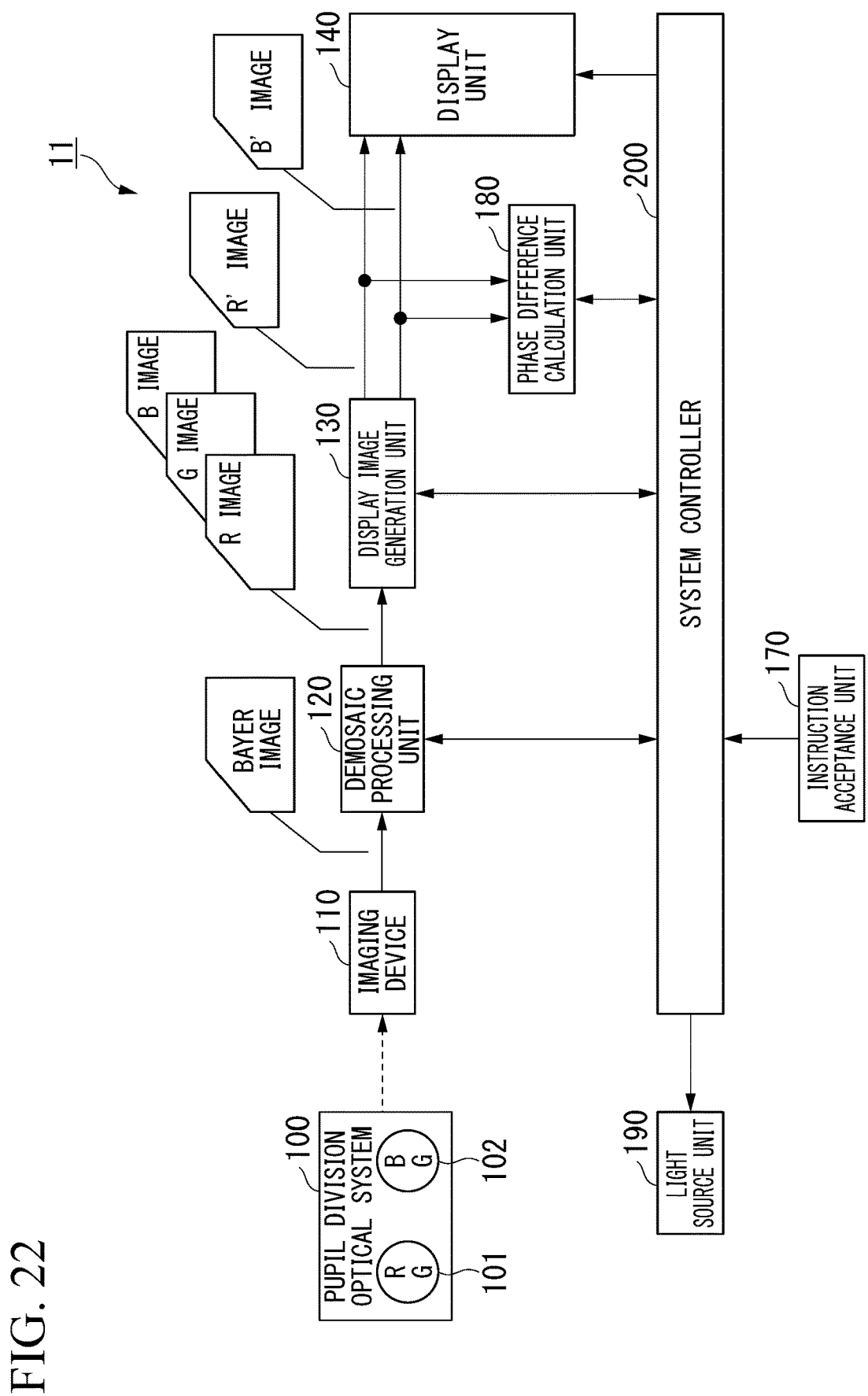
FIG. 22 is a block diagram showing a configuration of an endoscope apparatus according to an eighth embodiment of the present invention.

FIG. 22 shows a configuration of an endoscope apparatus 11 according to an eighth embodiment of the present invention. As shown in FIG. 22, the endoscope apparatus 11 includes a pupil division optical system 100, an imaging device 110, a demosaic processing unit 120, a display image generation unit 130, a display unit 140, an instruction acceptance unit 170, a phase difference calculation unit 180, a light source unit 190, and a system controller 200.

Each of the pupil division optical system 100, the imaging device 110, and the demosaic processing unit 120 is constituted similarly to each of the pupil division optical system 100, the imaging device 110, and the demosaic processing unit 120 shown in FIG. 1. In an industrial endoscope, the pupil division optical system 100 and the imaging device 110 are disposed at the distal end of an insertion unit to be inserted into the inside of an object for observation and measurement. Basically, the display image generation unit 130 is similar to the display image generation unit 130 shown in FIG. 1. The display image generation unit 130 generates an R' image and a B' image and outputs the generated R' image and the generated B' image to the display unit 140. Basically, the display unit 140 is similar to the display unit 140 shown in FIG. 1. The display unit 140 displays each of the R' image and the B' image generated by the display image generation unit 130 in a monochromatic way.

The instruction acceptance unit 170 accepts an instruction of a measurement point that represents a measurement position on a subject from a user. The phase difference calculation unit 180 calculates a phase difference between the R' image and the B' image generated by the display image generation unit 130. The phase difference calculation unit 180 may calculate a phase difference between an R image and a B image generated by the demosaic processing unit 120. The phase difference calculation unit 180 is constituted by an ASIC, an FPGA, a microprocessor, and the like. The light source unit 190 irradiates a subject with illumination light on the basis of the system controller 200. For example, the light source unit 190 is constituted by a light emitting diode (LED). The system controller 200 controls each unit in the endoscope apparatus 11.

Information of the measurement point designated by a user is input from the instruction acceptance unit 170 to the system controller 200. The system controller 200 outputs the information of the measurement point to the phase difference calculation unit 180. The phase difference calculation unit 180 calculates a phase difference at the measurement point input from the system controller 200 and outputs a calculation result to the system controller 200. The system controller 200 measures a distance to the subject and a three-dimensional shape of the subject on the basis of the phase difference input from the phase difference calculation unit 180. The system controller 200 outputs graphic data for displaying the measurement point and character data for displaying a measurement result to the display unit 140. The display unit 140 displays an image on which the measurement point and the measurement result are superimposed.

Figure 23:
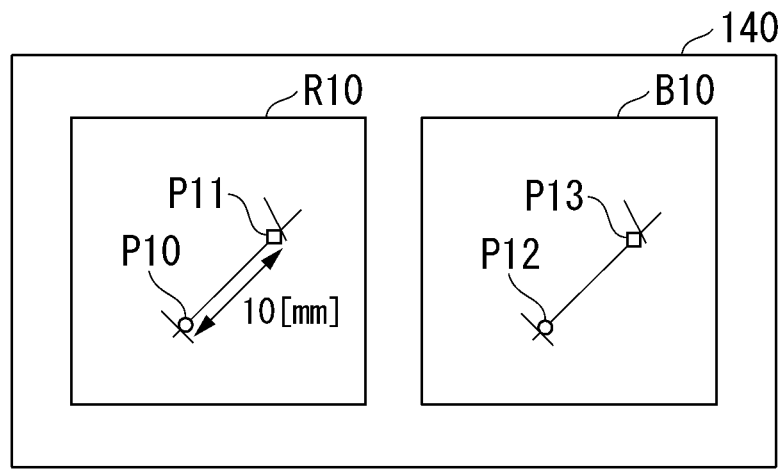
FIG. 23 is a diagram showing an example of an image displayed in the eighth embodiment of the present invention.

FIG. 23 shows an example of an image displayed on the display unit 140. An R' image R10 and a B' image B10 that are monochrome images are displayed. For example, a user designates a measurement point for the R' image R10. A measurement point P10 and a measurement point P11 designated by a user are superimposed and displayed on the R' image R10. In addition, the distance (10 [mm]) between two points on a subject corresponding to the measurement point P10 and the measurement point P11 is displayed as a measurement result on the R' image R10. A point P12 corresponding to the measurement point P10 and a point P13 corresponding to the measurement point P11 are superimposed and displayed on the B' image B10.

The display unit 140 may be constituted independently of the endoscope apparatus 11. In this case, the endoscope apparatus 11 includes the output unit 150. The output unit 150 outputs a monochrome correction image generated by the display image generation unit 130 to the display unit 140. The display image generation unit 130 may be disposed at the former stage of the demosaic processing unit 120. At least one of the imaging apparatus 10, the imaging apparatus 10a, the imaging apparatus 10b, the imaging apparatus 10c, the imaging apparatus 10d, the imaging apparatus 10e, and the imaging apparatus 10f may include the phase difference calculation unit 180.

The endoscope apparatus 11 according to the eighth embodiment can suppress double images due to color shift of an image and improve visibility of an image as with the imaging apparatus 10 according to the first embodiment. Since a user can observe an image in which double images due to color shift are suppressed and visibility is improved, the user can easily designate a measurement point. For this reason, the endoscope apparatus 11 can increase work efficiency of a user.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging apparatus comprising:
a pupil division optical system including a first pupil transmitting light of a first wavelength band and a second pupil transmitting light of a second wavelength band different from the first wavelength band;
an imaging device configured to capture an image of light transmitted through the pupil division optical system and a first color filter having a first transmittance characteristic and light transmitted through the pupil division optical system and a second color filter having a second transmittance characteristic partially overlapping the first transmittance characteristic, and output the captured image;
a processor configured to generate a monochrome correction image or a correction image by correcting a value that is based on components overlapping between the first transmittance characteristic and the second transmittance characteristic for the captured image, the monochrome correction image including a value that is based on one of the first transmittance characteristic and the second transmittance characteristic, the correction image including a value that is based on the first transmittance characteristic and a value that is based on the second transmittance characteristic; and
a display configured to display the monochrome correction image generated by the processor or display the monochrome correction image generated by processing the correction image.

2. An imaging apparatus comprising:
a pupil division optical system including a first pupil transmitting light of a first wavelength band and a second pupil transmitting light of a second wavelength band different from the first wavelength band;
an imaging device configured to capture an image of light transmitted through the pupil division optical system and a first color filter having a first transmittance characteristic and light transmitted through the pupil division optical system and a second color filter having a second transmittance characteristic partially overlapping the first transmittance characteristic, and output the captured image; and
a processor configured to:
generate a monochrome correction image or a correction image by correcting a value that is based on components overlapping between the first transmittance characteristic and the second transmittance characteristic for the captured image, the monochrome correction image including a value that is based on one of the first transmittance characteristic and the second transmittance characteristic, the correction image including a value that is based on the first transmittance characteristic and a value that is based on the second transmittance characteristic; and
output the monochrome correction image to a display or output the monochrome correction image generated by processing the correction image to the display.

3. The imaging apparatus according to claim 1,
wherein the processor is configured to generate at least one of a first monochrome correction image and a second monochrome correction image, the first monochrome correction image is the monochrome correction image generated by correcting a value that is based on components overlapping between the first transmittance characteristic and the second transmittance characteristic for the captured image having components that are based on the first transmittance characteristic, and the second monochrome correction image is the monochrome correction image generated by correcting a value that is based on components overlapping between the first transmittance characteristic and the second transmittance characteristic for the captured image having components that are based on the second transmittance characteristic.

4. The imaging apparatus according to claim 2,
wherein the processor is configured to generate at least one of a first monochrome correction image and a second monochrome correction image,
the first monochrome correction image is the monochrome correction image generated by correcting a value that is based on components overlapping between the first transmittance characteristic and the second transmittance characteristic for the captured image having components that are based on the first transmittance characteristic, and
the second monochrome correction image is the monochrome correction image generated by correcting a value that is based on components overlapping between the first transmittance characteristic and the second transmittance characteristic for the captured image having components that are based on the second transmittance characteristic.

5. The imaging apparatus according to claim 3,
wherein the processor is configured to generate at least one of the first monochrome correction image and the second monochrome correction image in accordance with an instruction from a user.

6. The imaging apparatus according to claim 4,
wherein the processor is configured to generate at least one of the first monochrome correction image and the second monochrome correction image in accordance with an instruction from a user.

7. The imaging apparatus according to claim 3,
wherein the processor is configured to generate at least one of the first monochrome correction image and the second monochrome correction image in accordance with a result of analyzing the captured image.

8. The imaging apparatus according to claim 4,
wherein the processor is configured to generate at least one of the first monochrome correction image and the second monochrome correction image in accordance with a result of analyzing the captured image.

9. The imaging apparatus according to claim 3,
wherein the processor is configured to generate at least one of the first monochrome correction image and the second monochrome correction image in accordance with a histogram of the captured image.

10. The imaging apparatus according to claim 4,
wherein the processor is configured to generate at least one of the first monochrome correction image and the second monochrome correction image in accordance with a histogram of the captured image.

11. The imaging apparatus according to claim 3,
wherein the processor is configured to generate at least one of the first monochrome correction image and the second monochrome correction image in accordance with contrast of the captured image.

12. The imaging apparatus according to claim 4,
wherein the processor is configured to generate at least one of the first monochrome correction image and the second monochrome correction image in accordance with contrast of the captured image.

13. The imaging apparatus according to claim 3,
wherein the processor is configured to generate at least one of the first monochrome correction image and the second monochrome correction image in accordance with spectral characteristics of a subject.

14. The imaging apparatus according to claim 4,
wherein the processor is configured to generate at least one of the first monochrome correction image and the second monochrome correction image in accordance with spectral characteristics of a subject.

15. The imaging apparatus according to claim 1,
wherein the processor is configured to generate a first monochrome correction image and a second monochrome correction image in parallel with analysis of the captured image,
the first monochrome correction image is the monochrome correction image generated by correcting a value that is based on components overlapping between the first transmittance characteristic and the second transmittance characteristic for the captured image having components that are based on the first transmittance characteristic,
the second monochrome correction image is the monochrome correction image generated by correcting a value that is based on components overlapping between the first transmittance characteristic and the second transmittance characteristic for the captured image having components that are based on the second transmittance characteristic, and
the processor is configured to select at least one of the first monochrome correction image and the second monochrome correction image in accordance with a result of analyzing the captured image.

16. The imaging apparatus according to claim 2,
wherein the processor is configured to generate a first monochrome correction image and a second monochrome correction image in parallel with analysis of the captured image,
the first monochrome correction image is the monochrome correction image generated by correcting a value that is based on components overlapping between the first transmittance characteristic and the second transmittance characteristic for the captured image having components that are based on the first transmittance characteristic,
the second monochrome correction image is the monochrome correction image generated by correcting a value that is based on components overlapping between the first transmittance characteristic and the second transmittance characteristic for the captured image having components that are based on the second transmittance characteristic, and
the processor is configured to select at least one of the first monochrome correction image and the second monochrome correction image in accordance with a result of analyzing the captured image.

17. The imaging apparatus according to claim 1,
wherein the processor is configured to generate the monochrome correction image by processing the correction image.

18. The imaging apparatus according to claim 2, wherein the processor is configured to generate the monochrome correction image by processing the correction image.

19. An endoscope apparatus comprising the imaging apparatus according to claim 1.

* * * * *